(12) United States Patent
Haarburger

(10) Patent No.: US 10,918,090 B2
(45) Date of Patent: Feb. 16, 2021

(54) LEASH WITH INLINE ARTICLE DISPENSER

(71) Applicant: Woof Pet, Inc., Dover, DE (US)

(72) Inventor: Daniel Haarburger, Boulder, CO (US)

(73) Assignee: Woof Pet, Inc., Dover, DE (US)

(*) Notice: Subject to any disclaimer, the term of this patent is extended or adjusted under 35 U.S.C. 154(b) by 0 days.

(21) Appl. No.: 16/544,678

(22) Filed: Aug. 19, 2019

(65) Prior Publication Data

US 2020/0305395 A1 Oct. 1, 2020

Related U.S. Application Data

(60) Provisional application No. 62/825,392, filed on Mar. 28, 2019.

(51) Int. Cl.
*A01K 27/00* (2006.01)
*E01H 1/12* (2006.01)

(52) U.S. Cl.
CPC .......... *A01K 27/008* (2013.01); *A01K 27/003* (2013.01); *E01H 1/1206* (2013.01); *E01H 2001/128* (2013.01); *E01H 2001/1273* (2013.01)

(58) Field of Classification Search
CPC .... A01K 27/00; A01K 27/003; A01K 27/005; A01K 27/006; A01K 27/008; E01H 2001/1273; E01H 2001/128
USPC .......................................................... 119/795
See application file for complete search history.

(56) References Cited

U.S. PATENT DOCUMENTS

| 2,031,033 A | * | 2/1936 | Denebeim | B65D 85/672 225/47 |
| 3,648,910 A | * | 3/1972 | Benson | A47K 10/40 225/53 |
| 5,135,146 A | * | 8/1992 | Simhaee | B65H 35/10 225/80 |

(Continued)

FOREIGN PATENT DOCUMENTS

| DE | 2904289 A1 | * | 8/1980 | ........... E01H 1/1206 |
| FR | 2853335 A1 | * | 10/2004 | ........... A01K 27/006 |

(Continued)

OTHER PUBLICATIONS

Espacenet English-language translation of DE 2904289 (Year: 1980).*

(Continued)

*Primary Examiner* — Lisa L Tsang
(74) *Attorney, Agent, or Firm* — Duft & Bornsen, PC

(57) ABSTRACT

Systems and methods are provided for integrated article dispensers for leashes which provide greater handling and responsiveness. One embodiment is an apparatus is in the form of an article dispenser that includes a first end for coupling with a first tensile member, a second end for coupling with the second tensile member, and a rigid housing between the first end and the second end. The rigid housing defines an internal volume for storing articles, and that further defines an opening. In response to the article dispenser bearing a threshold amount of tension, a centroid of the article dispenser aligns within a threshold distance of being collinear with a force that generates the tension. While the centroid of the article dispenser is within the threshold distance of being collinear, rotation of the system about an axis of the forcer applies less than a threshold torque to the tensile members.

20 Claims, 35 Drawing Sheets

(56) References Cited

U.S. PATENT DOCUMENTS

| | | | | |
|---|---|---|---|---|
| 5,441,017 A | * | 8/1995 | Lindsay | A01K 27/003 119/161 |
| 5,680,978 A | * | 10/1997 | Pinion | B65D 85/672 220/230 |
| 5,727,500 A | | 3/1998 | Conboy | |
| 6,053,129 A | * | 4/2000 | Akre | A01K 27/005 119/795 |
| 6,076,717 A | * | 6/2000 | Edwards | A01K 27/004 225/106 |
| 6,085,695 A | | 7/2000 | Miller et al. | |
| D464,179 S | * | 10/2002 | Petersen | D30/153 |
| D492,454 S | | 6/2004 | Saunders | |
| D527,495 S | | 8/2006 | Bird | |
| 7,418,926 B2 | * | 9/2008 | Kung | A01K 27/005 119/769 |
| 7,789,042 B1 | | 9/2010 | Dinon | |
| D654,739 S | * | 2/2012 | Chin | D3/215 |
| D733,978 S | | 7/2015 | Bayless | |
| 9,930,868 B2 | | 4/2018 | Cox | |
| 2005/0087147 A1 | | 4/2005 | Meter | |
| 2006/0214442 A1 | * | 9/2006 | Jones | E01H 1/1206 294/1.4 |
| 2008/0006223 A1 | | 1/2008 | Sugalski | |
| 2008/0216767 A1 | * | 9/2008 | Wang | A01K 27/006 119/795 |
| 2009/0173761 A1 | | 7/2009 | Berry | |
| 2010/0006576 A1 | | 1/2010 | Berry | |
| 2010/0024741 A1 | * | 2/2010 | Schoppman | A01K 27/005 119/795 |
| 2011/0232031 A1 | * | 9/2011 | Salais | A01K 27/006 16/111.1 |
| 2012/0167834 A1 | | 7/2012 | Cummings et al. | |
| 2016/0000198 A1 | | 1/2016 | Labadini et al. | |
| 2017/0202184 A1 | * | 7/2017 | Moore | A01K 27/003 |
| 2017/0258041 A1 | * | 9/2017 | Dadalto | A01K 27/008 |

FOREIGN PATENT DOCUMENTS

| | | | | |
|---|---|---|---|---|
| GB | 2424243 A | * | 9/2006 | A44B 11/266 |
| WO | WO-2013177681 A1 | * | 12/2013 | A01K 27/00 |

OTHER PUBLICATIONS

Google Translate English-language translation of De 2904289 (Year: 1980).*
Dog Leash with Poop Bag Dispenser & Poop Holder Plus Treat Pouch; https://www.groupon.com/deals/gs-dog-leash-with-built-in-poop-bag-dispenser; Jul. 9, 2019.
Eezwalker Built-In Poop Bag Leash; http://www.eezwalker.com; Jul. 9, 2019.
Fozzy Dog; The Original; https://store.fozzydoginc.com/products/fozzy-dog-leash-large; Jul. 9, 2019.
High 5 Dogs; https://high5dogs.com; Jul. 9, 2019.
Konga Waste Bag Retractable Dog Leash; https://www.influenster.com/reviews/konga-waste-bag-retractable-dog-leash; Jul. 9, 2019.
Paww5 Ft Pick Pocket Leash With Poop Bag Dispenser Dog Pet Hidden Pocket; https://people.com/shop; Jul. 9, 2019.
The Grommet; https://www.thegrommet.com; Jul. 9, 2019.
Walk Whiz multi-Leash: Retractable Dog Leash With Integrated Waste Bag Holder and Water Bowl; https://oddity mall.com/walkwhiz-multi-leash; Jul. 9, 2019.

* cited by examiner

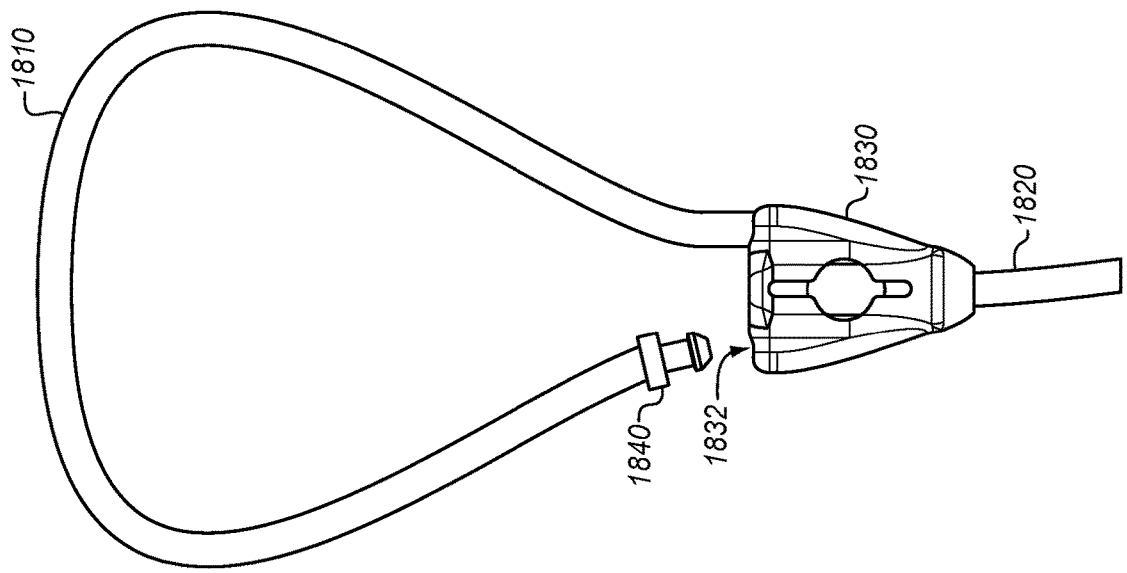
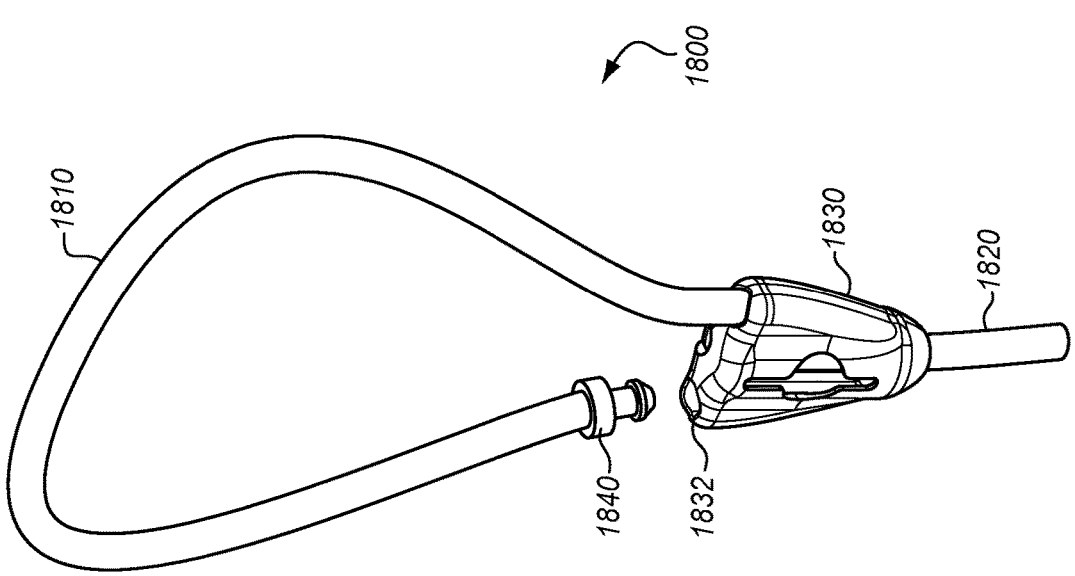

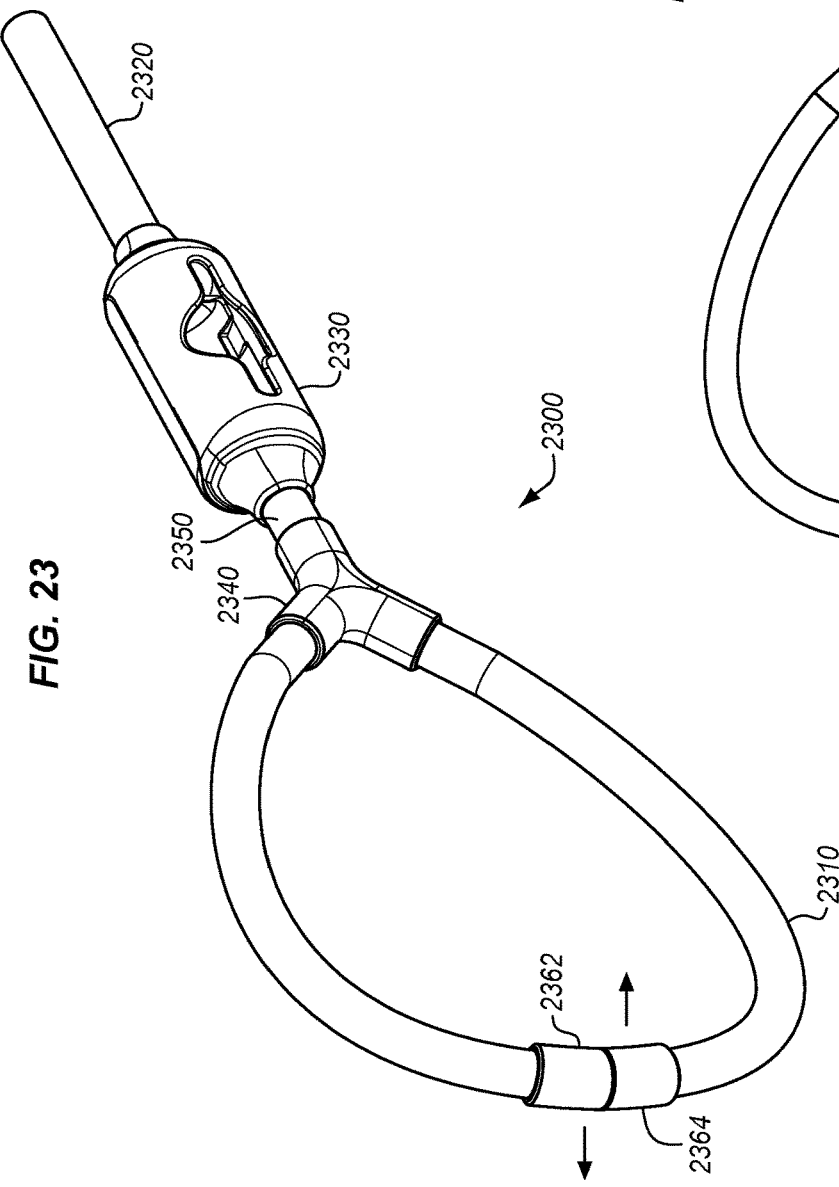
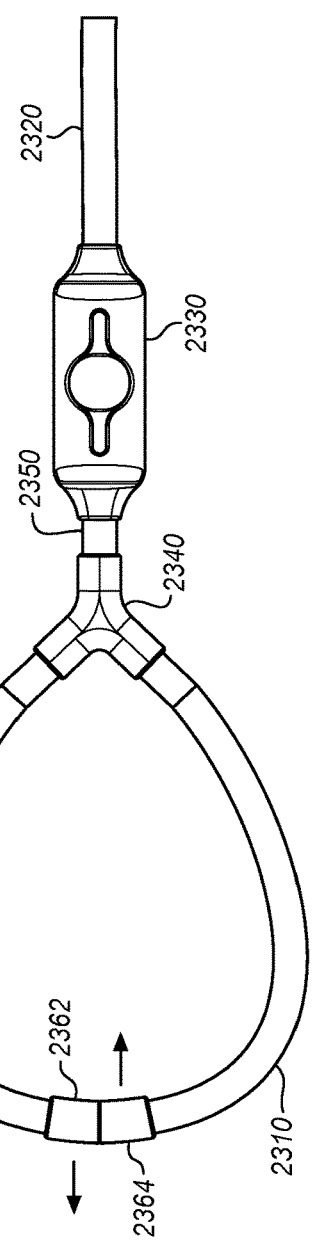

LEASH WITH INLINE ARTICLE DISPENSER

FIELD

The disclosure relates to the field of accessories for animals, and in particular to leashes for domestic animals.

BACKGROUND

Leashes are used to facilitate the handling of domestic animals, by enabling an animal handler to direct the movement of an animal, and if necessary to restrain the animal. The use of a leash may also be required in certain locations by law, in order to ensure that domestic animals remain fully under the control of their handler.

While leashes facilitate animal handling, effective leash use requires an animal handler to grip the leash with one or both hands. This reduces the ability of the animal handler to perform other tasks. For example, an animal handler that is presently using a leash may find it difficult to simultaneously access a pocket storing an edible treat for behavioral reinforcement, or to operate a training whistle, or to handle a flashlight, or to dispense and operate sanitary bags to clean up waste from the animal, etc.

Developers of accessories for animals have striven to provide solutions to these problems. However, current solutions remain cumbersome and lack ergonomic efficiency. Hence, those who seek to enhance the abilities of an animal handler during leash use seek out enhanced systems and methods for achieving these goals.

SUMMARY

Embodiments described herein provide for enhanced leashes that include integrated article dispensers. Specifically, an article dispenser is made integral with the leash such that it bears applied tension at the leash. When the leash experiences tension, a center of mass of the article dispenser naturally enters into alignment with forces applying the tension at either end of the leash. This balance of weight within the dispenser causes the leash to feel more ergonomic and responsive, because the article dispenser does not apply a torque/twist to the leash, even if the leash is rotated, moved from side-to-side, or moved up and down (e.g., as occurs during walking or running). The article dispenser also does not bounce up and down or side to side in response to the sudden application of tension, because its centroid naturally aligns with the leash during use.

One embodiment is a system in the form of a leash with an integrated article dispenser. The system includes a first tensile member, a second tensile member, and an article dispenser disposed between the first tensile member and the second tensile member. The article dispenser includes a first end that is mechanically coupled with the first tensile member, a second end that is mechanically coupled with the second tensile member, and a rigid housing that is disposed between the first end and the second end, and that defines an internal volume for storing articles. The rigid housing further defines an opening which communicates between the internal volume and an exterior of the housing, wherein a dimension of the opening corresponds with a dimension of the articles. In response to the article dispenser bearing a threshold amount of tension between the tensile members, a centroid of the article dispenser aligns within a threshold distance of being collinear with a force that generates the tension. While the centroid of the article dispenser is within the threshold distance of being collinear with the force, rotation of the system about an axis of the force does not cause the article dispenser to apply more than a threshold torque to the tensile members. The threshold distance is one quarter of a dimension of the article dispenser.

A further embodiment is a method for assembling a leash with an integrated article dispenser. The method includes acquiring a first tensile member, acquiring a second tensile member, acquiring an article dispenser configured to dispense articles from within an internal volume, mechanically coupling a first end of the article dispenser with the first tensile member, and mechanically coupling a second end of the article dispenser with the second tensile member. The coupling is performed such that in response to the article dispenser bearing a threshold amount of tension between the tensile members, a centroid of the article dispenser aligns within a threshold distance of being collinear with a force that generates the tension. The threshold distance is one quarter of a dimension of the article dispenser.

A still further embodiment is an apparatus for use with a leash. The apparatus is in the form of an article dispenser that includes a first end that is configured to mechanically couple with a first tensile member, a second end that is configured to mechanically coupled with the second tensile member, and a rigid housing that is disposed between the first end and the second end. The rigid housing defines an internal volume for storing articles, and that further defines an opening which communicates between the internal volume and an exterior of the housing, wherein a dimension of the opening corresponds with a dimension of the articles. In response to the article dispenser bearing a threshold amount of tension between the tensile members, a centroid of the article dispenser aligns within a threshold distance of being collinear with a force that generates the tension. While the centroid of the article dispenser is within the threshold distance of being collinear with the force, rotation of the system about an axis of the force does not cause the article dispenser to apply more than a threshold torque to the tensile members. The threshold distance is one quarter of a dimension of the article dispenser.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIGS. 18-19 are views of a leash that includes an integrated article dispenser in a fourth illustrative embodiment.

FIGS. 23-24 are views of a leash that includes an integrated article dispenser in a sixth illustrative embodiment.

DESCRIPTION

The figures and the following description depict specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
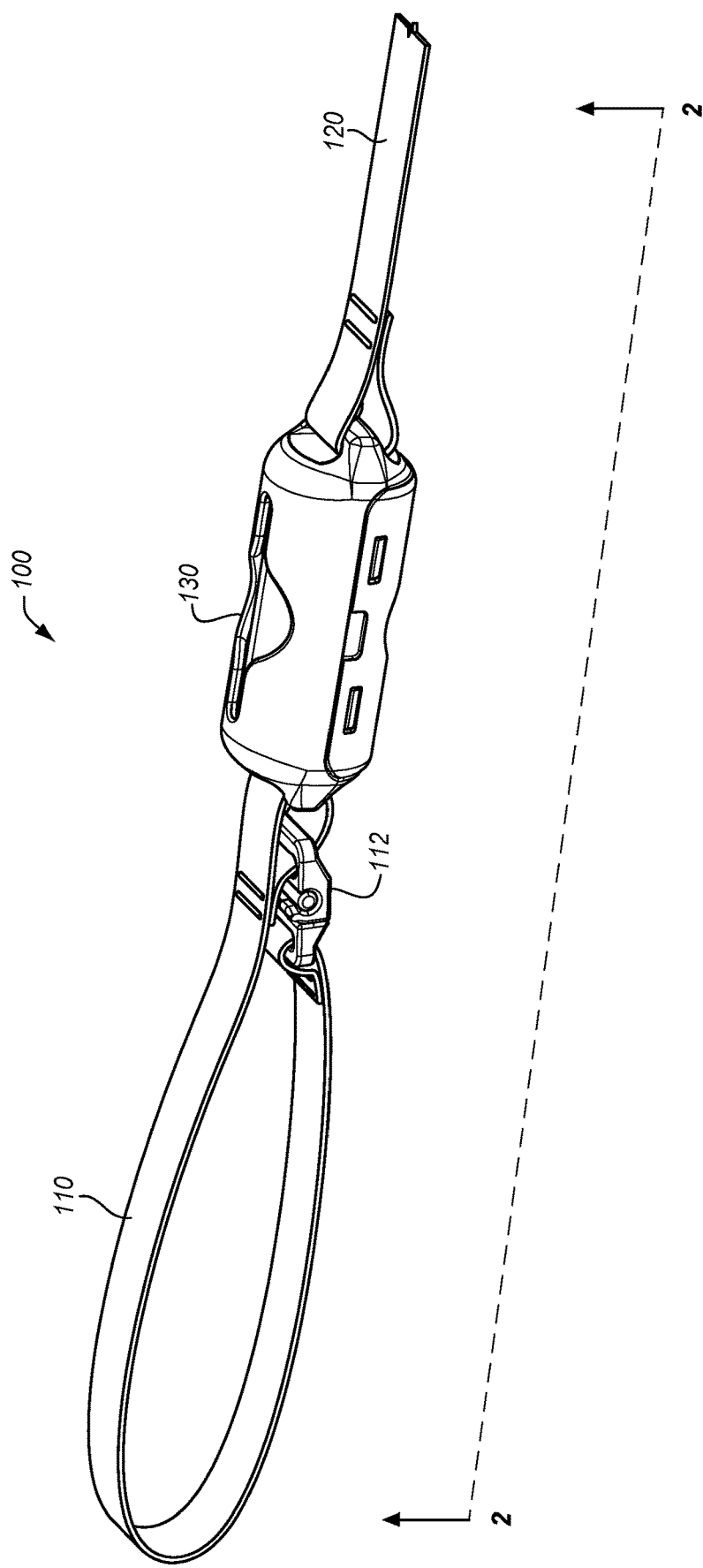
FIG. 1 is a perspective view of a leash that includes an integrated article dispenser in an illustrative embodiment.

FIG. 1 is a perspective view of a leash 100 that includes an integrated article dispenser 130 in an illustrative embodiment. As shown in FIG. 1, the leash 100 includes a first tensile member 110 in the form of a handle of webbing that includes a clip 112. The leash 100 also includes a second tensile member 120 for attachment to a collar of an animal, and an article dispenser 130. The tensile members are any suitable components capable of transferring tension under load, and may comprise straps/webbing, cords/ropes, chains, bars, linkages, etc. The article dispenser 130 enables a handler to manually dispense articles (e.g., sanitary bags, edible treats, disposable gloves, medicine, etc.) from the leash 100. These articles may relate to the animal being handled, and/or may facilitate handling of the animal.

The article dispenser 130 is dimensioned and integrated into the leash 100 such that its centroid (i.e., center of mass) becomes collinear (or substantially collinear) with forces that hold the leash in tension during use. This means that the article dispenser 130 naturally becomes in-line with the leash when tension is applied, and does so without twisting or torqueing the leash 100. Phrased another way, while bearing at least a threshold amount of tension, the article dispenser 130 responds to acceleration of the leash 100 without twisting the tensile members 110 and 120. This feature makes the leash 100 feel more responsive to a handler operating the leash, which enables the handler to more easily detect sudden movements of the animal via touch. This feature also enables the handler's motions to be transmitted through the leash more directly and quickly to the animal being handled, which increases compliance of the animal with commands given via leash tension (e.g., movements of the leash directing the animal to heel or stop).

In some embodiments, the article dispenser weighs between one half an ounce and six ounces, and carries between half an ounce and ten ounces of articles when fully loaded, and has a length between two and five inches. In further embodiments, a weight of the article dispenser 130 per unit of length of the leash 100 is within a desired range of the weight per unit length of the leash itself (e.g., between one-quarter and five times the weight of the leash per unit of length, equal to the weight of the leash per unit length, etc.). When within the desired range, the article dispenser 130 responds in a similar fashion to the strap/cord/etc. that the leash is made from, which causes the responsiveness of the leash 100 to remain consistent throughout its entire length.

Figure 2:
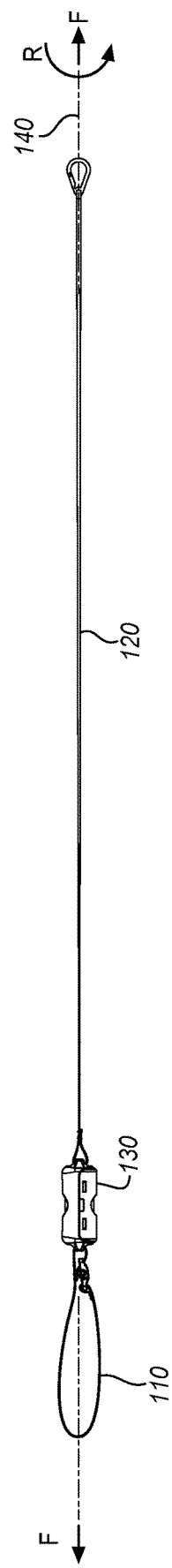
FIG. 2 is a side view of a leash that includes an integrated article dispenser in an illustrative embodiment.

FIG. 2 is a side view of a leash 100 that includes an integrated article dispenser 130 in an illustrative embodiment. The article dispenser 130 is the sole entity that mechanically unites the tensile members 110 and 120. As shown in FIG. 2, when forces F and/or rotations R are applied along an axis 140 to place the leash 100 into tension, the article dispenser 130 is held in-line with the leash. Further details of this arrangement are described with respect to the FIGS. below.

Figure 3:
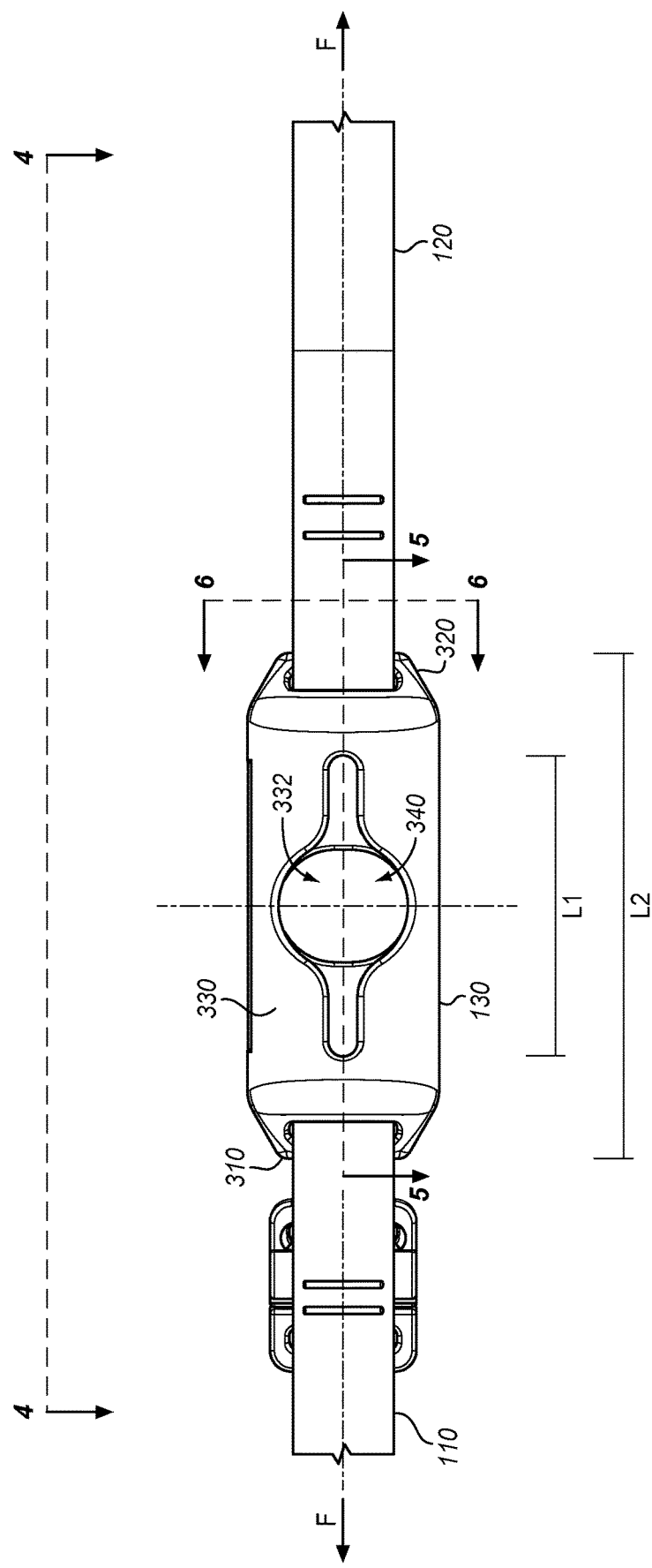
FIG. 3 is a top view of an article dispenser in an illustrative embodiment.

FIG. 3 is a top view of an article dispenser 130 in an illustrative embodiment. As shown in FIG. 3, the article dispenser 130 is coupled with tensile member 110 at a first end 310, and is coupled with tensile member 120 at a second end 320. The first end 310 and the second end 320 may be rigid or flexible, and may comprise materials such as plastics, metal, composite materials, or rubber capable of bearing expected amounts of tension (e.g., depending on the type of animal the leash is designed for, between tens and hundreds of pounds of force). In this embodiment, the first end 310 forms a loop that the tensile member 110 threads through, and the second end 320 forms a loop that the tensile member 120 threads through.

A housing 330 is disposed between the ends, and defines an internal volume that stores articles such as sanitary bags. In this embodiment, the internal volume forms a cylindrical shape. The housing is rigid, and may comprise materials such as plastics, metal, or composite materials. Unlike a soft housing, a rigid housing does not deform under tensile load. Deformation is undesirable because it changes the dimensions of openings for retrieving articles, and therefore reduces the ease of retrieving articles therefrom. Deformation also alters a length of the leash during use, which is undesirable because it increases the difficulty of keeping the animal being handled within a desired range of the handler. Still further, certain types of deformation (e.g., elastic deformation) may apply spring forces to the leash, which further increases the difficulty of operating the leash.

A rigid housing provides additional benefits over a soft housing, because a rigid housing prevents tensile forces at a leash from being applied to stored articles, which preserves a shape of the articles and prevents brittle articles (such as edible treats) from breaking or crushing. Still further, a rigid housing enables the contents of an article dispenser to be reliably positioned and oriented within the article dispenser, regardless of load applied to the article dispenser. That is, articles kept within the dispenser do not tumble or change position relative to each other as the leash is used.

The articles stored within housing 330 are dispensed via an opening 332 defined by the housing 330. The opening 332 communicates between an exterior and an internal volume of the housing 330 where the articles are stored. A length L1 of the opening 332 corresponds with a dimension of articles stored within the housing. For example, if the articles are flexible or easily capable of wrinkling to change shape, L1 may correspond with a dimension of an article if it is between half and twice as large as the dimension of the article. If the articles are rigid, L1 may correspond with a dimension of an article if L1 is greater than the dimension. In this embodiment, the length L1 of the opening 332 is less than the length L2 of the article dispenser 130, although in further embodiments the opening 332 may continue for a long distance across the curvature of the article dispenser 130, and hence L1 may be longer than L2. That is, the opening 332 may wrap around the edges of the article dispenser 130.

As shown in FIG. 3, when a threshold level of tension is applied to the leash 100 by forces F, a centroid 340 of the article dispenser 130 (i.e., a volumetric center of mass of the article dispenser) is held collinear with the forces F. Starting from rest, an increasing amount of tension increases the level of alignment of the centroid 340 with the forces, until the threshold level is met and the centroid 340 of the article dispenser becomes collinear with the forces applying tension. This enhances the responsiveness of the leash during use by an animal handler, as discussed below. It also makes the leash more stable when under high tension (i.e., by preventing bouncing, swinging, and other harmonic motions). This is beneficial because high-tension loads are common in critical situations, such as when a dog attempts to chase a rabbit into a road that has heavy traffic.

Figure 4:
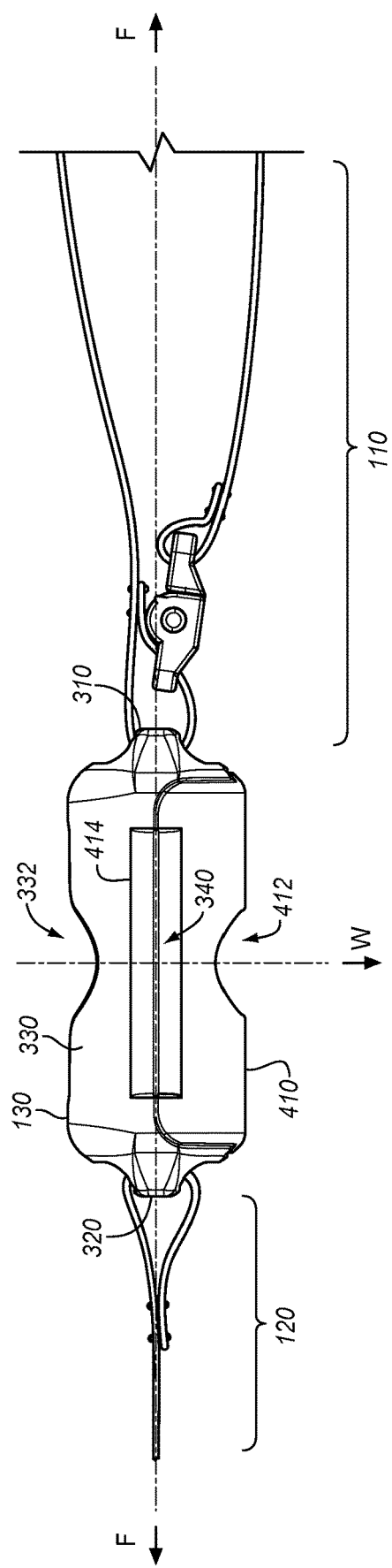
FIG. 4 is a side view of an article dispenser in an illustrative embodiment.

FIG. 4 is a side view of an article dispenser 130 in an illustrative embodiment, and corresponds with view arrows 4 of FIG. 3. FIG. 4 illustrates that the article dispenser 130 includes a hatch 410 for accessing the internal volume in order to restock the article dispenser 130 with articles. The hatch 410 communicates with the internal volume, and is affixed to the housing 330 via a living hinge 414 or other suitable joint (e.g., a general purpose hinge, a spring hinge, etc.). The use of a hatch 410 provides a technical benefit, because it enables a user to quickly access the contents of the article dispenser 130 for replacement. Still further, the use of a hatch 410 allows for the article dispenser 130 to be implemented as one continuous body (i.e. instead of two separate halves that snap together), which increases durability and strength of the article dispenser 130. The use of a living hinge instead of a traditional hinge may result in reduced bulk and weight, helping to ensure weight distributions that prevent twisting and imbalance at a leash, even when under dynamic load.

FIG. 4 further illustrates a second opening 412, disposed within hatch 410, that enables access to the internal volume. The second opening 412 and first opening may be manually manipulated to rotate a cylinder of articles within the internal volume. As shown in FIG. 4, the centroid 340 of the article dispenser 130 is collinear with forces F, such that the forces F counteract any sagging caused by the weight W of the article dispenser 130. The forces F also hold the centroid 340 of the article dispenser 130 collinear with them.

Figure 5:
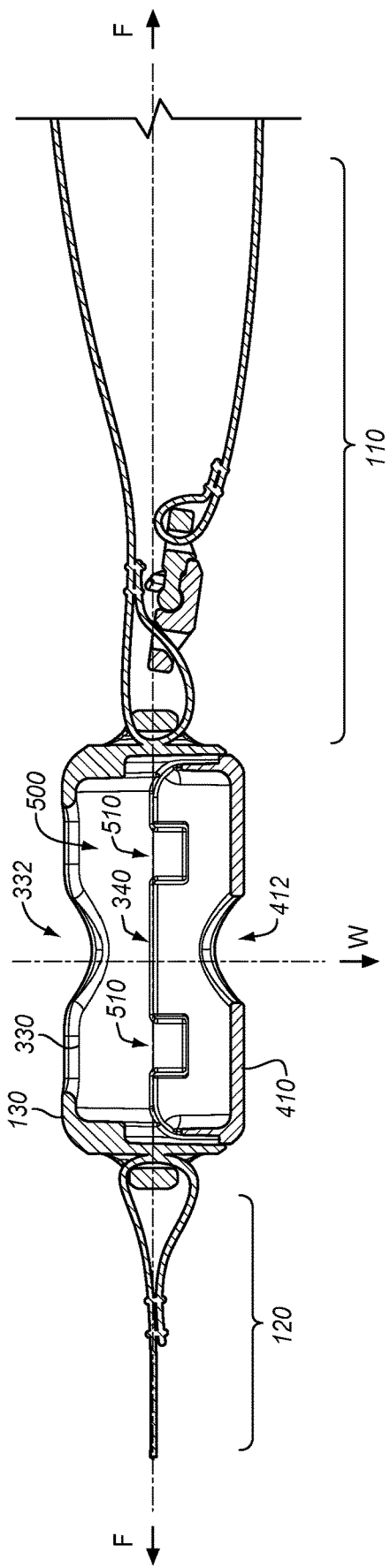
FIG. 5 is a section cut view of an article dispenser in an illustrative embodiment.
Figure 6A:
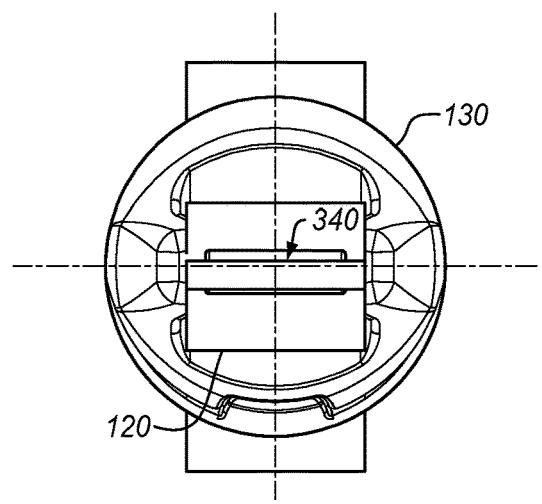
FIG. 6 is an end view of an article dispenser in an illustrative embodiment.
FIG. 6B is an end view of a centroid at an article dispenser in an illustrative embodiment.

FIG. 5 is a section cut view of an article dispenser 130 in an illustrative embodiment, and corresponds with the view of FIG. 4. In FIG. 5, internal volume 500 of the housing 330 is clearly visible, as is the second opening 412. FIG. 5 further illustrates latches 510, which help to hold the hatch 410 closed. FIG. 6 is an end view of an article dispenser 130 in an illustrative embodiment, and corresponds with view arrows 6 of FIG. 3. FIG. 6 illustrates that centroid 340 of article dispenser 130 remains in-line with the tensile members of the leash while bearing at least a threshold amount of tension.

Figure 6B:
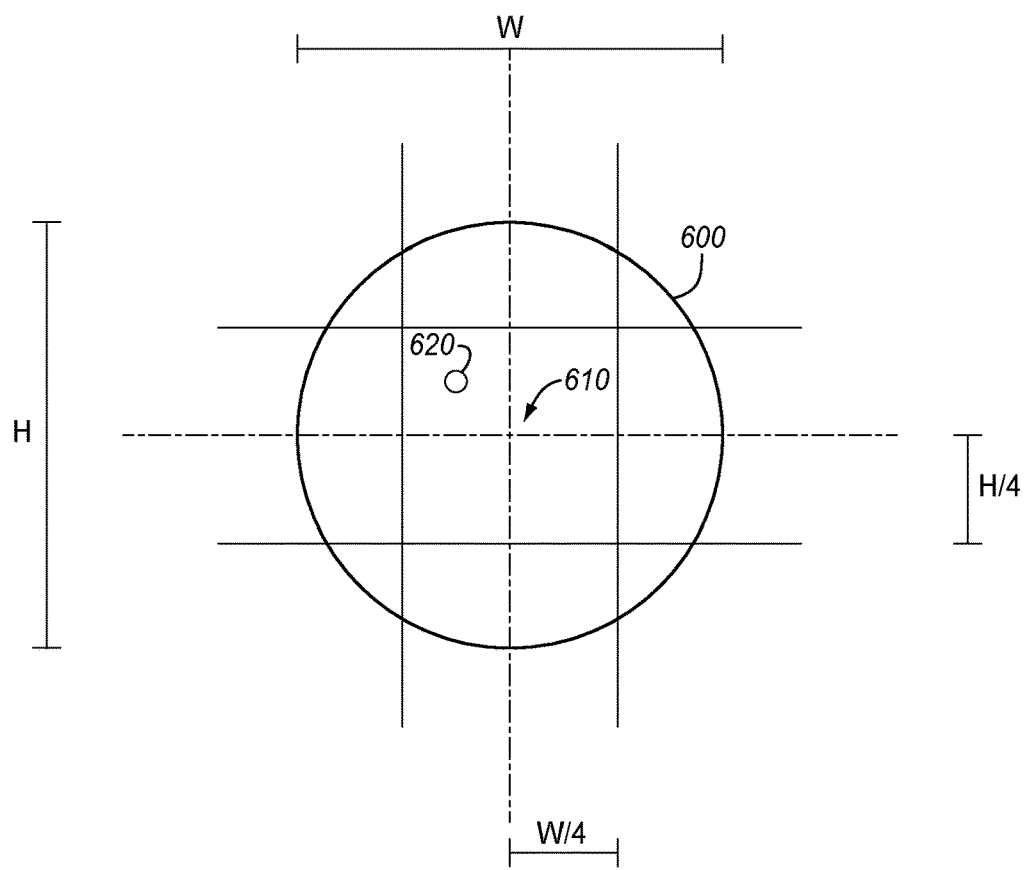

FIG. 6B is an end view of a centroid 620 at an article dispenser 600 having a cross-sectional width W and height H in an illustrative embodiment. W and H may vary along the length of the article dispenser. For an article dispenser having a circular cross section, W and H may equal a diameter of the article dispenser. In this embodiment, the centroid 620 of the article dispenser 600 is drawn within a threshold distance of collinearity with tensile forces when under load. Specifically, the article dispenser 600 bears a threshold amount of tension (e.g., a force equal to or greater than three hundred and fifty times the weight of the article dispenser 600 and its contents, plus any force needed to hold the tensile members in position). The forces generating the tension proceed into and out of the page from location 610 (e.g., a cross-sectional center of the article dispenser, or any location where tensile members attach to the article dispenser). When the tension is borne, the centroid 620 is drawn within a threshold distance of location 610. This threshold distance may, for example, be W/4, H/4, W/100, H/100, etc. Phrased another way, under sufficient tension the centroid 620 of the article dispenser 610 is drawn into alignment at a location no more than one quarter of W or H from the line formed by the tensile forces (e.g., for all cross-sections, for the smallest cross-section, for the largest cross-section, etc.). The centroid 620 may even, as discussed above, be drawn collinear with the line formed by the tensile forces. While the centroid 620 remains in these bounds, torque caused by the article dispenser 600 in response to rotation of the leash remains below a threshold amount (e.g., one quarter of W or H, multiplied by the weight of the article dispenser), which improves overall handling and responsiveness. Thus, even in embodiments wherein the article dispenser 600 includes a centroid that comes within a threshold distance of collinearity (instead of becoming precisely collinear) with the tensile forces, the benefits discussed above apply at least to some degree.

Figure 7:
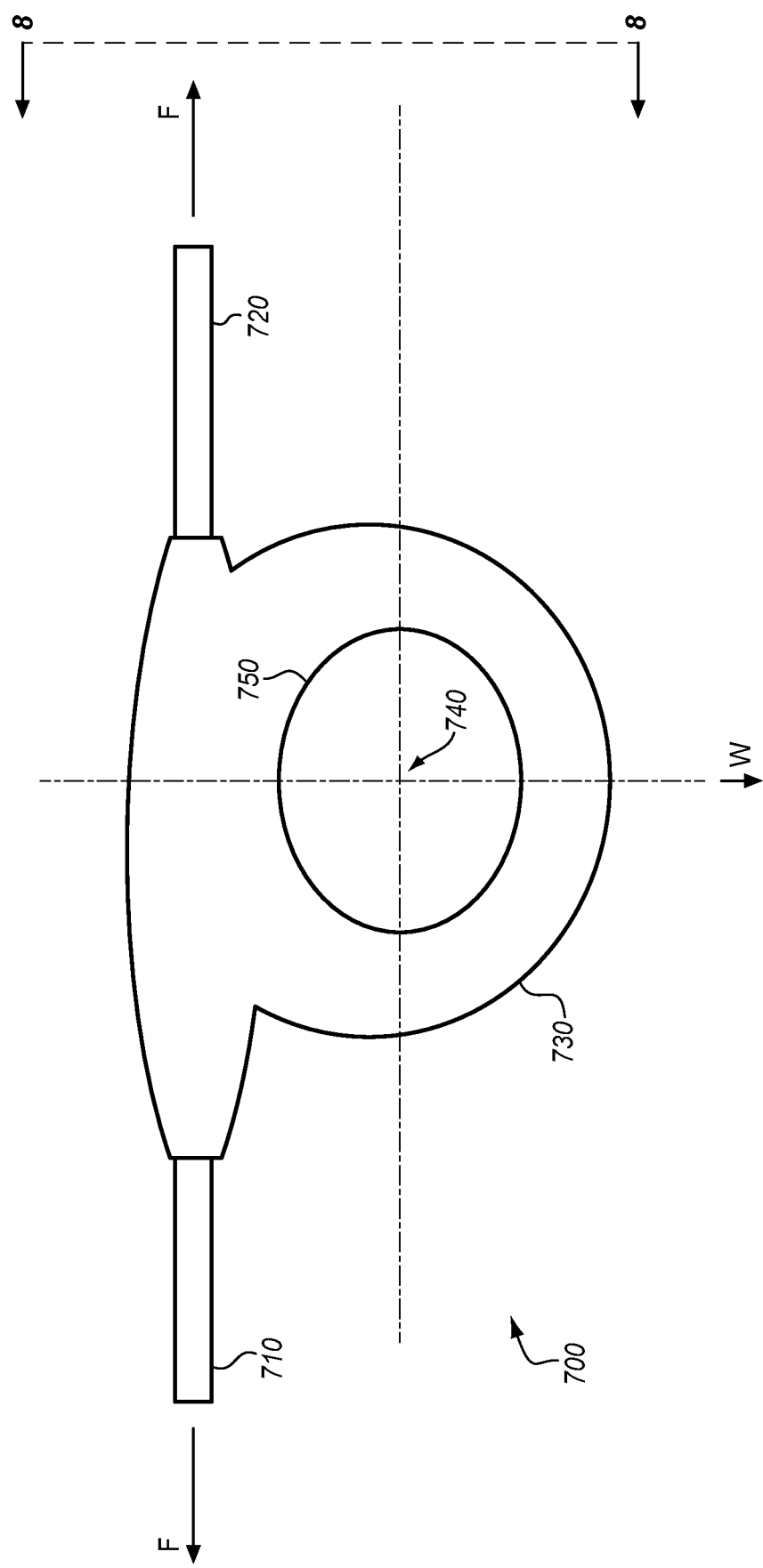
FIGS. 7-8 are views of a hypothetical leash accessory in an illustrative embodiment.
Figure 8:
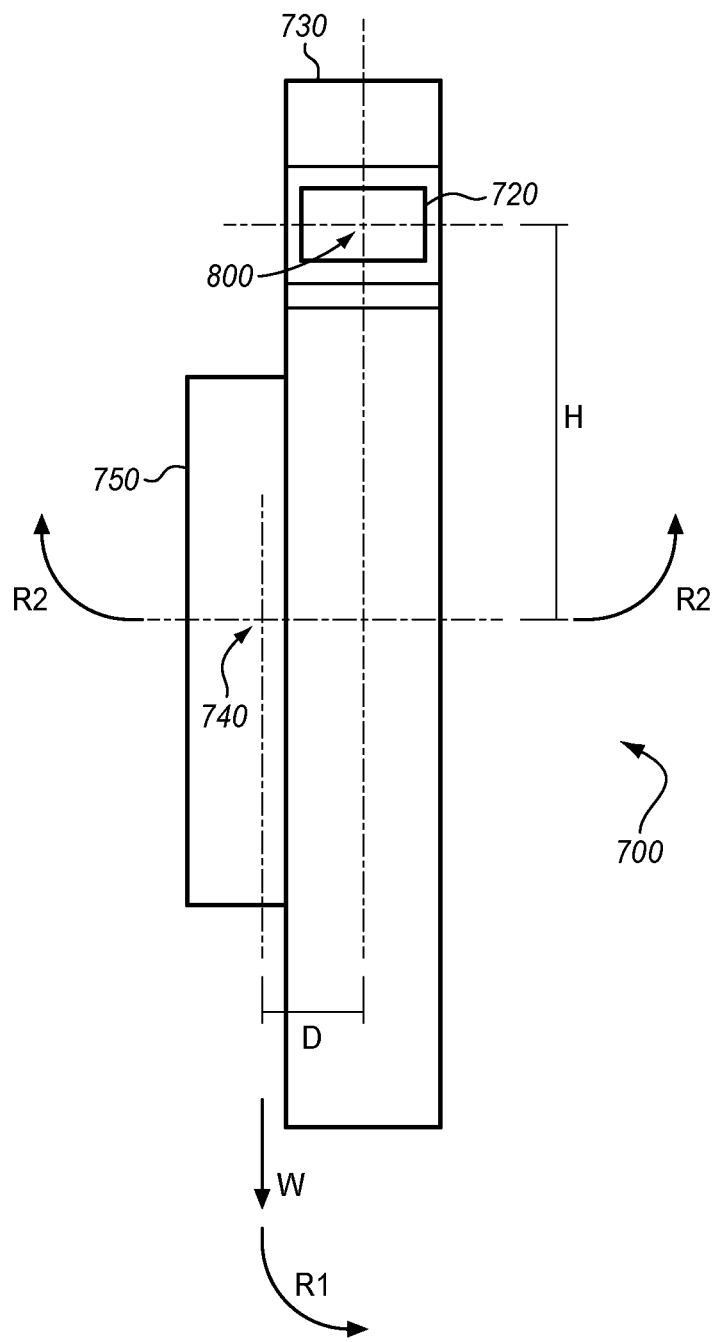

FIGS. 7-8 are views of a hypothetical leash accessory 700 in an illustrative embodiment, and depict how the fundamental physics of operation of the accessory 700 differ from that of article dispenser 130. FIG. 7 provides a side view of the accessory 700, which is coupled with a strap 710 and a strap 720, and includes a body having a blister 750 (e.g., storing additional lengths of strap 710). A centroid 740 of the accessory 700 is below the straps 710, which means that no amount of tension applied to the straps 710 and 720 can align the centroid 740 with forces F.

A leash is almost always in motion during use, including lateral motion. The position of centroid 740 means that accessory 700 is predisposed to start swinging whenever the leash moves into or out of the page of FIG. 7. Thus, physical design of the accessory 700 causes it to be vulnerable to swinging, tumbling, and twisting when tension is suddenly applied, which reduces the efficacy and responsiveness of any leash that accessory 700 is attached to. Furthermore, any rotation of straps 710 and 720 (e.g., performed by a handler twisting their wrist) causes the accessory to impart a torque to the straps (i.e., because its centroid resists the rotation and attempts to return the accessory 700 to a vertically oriented state). This torque reduces comfort for the handler and torques the handler's wrist, reducing responsiveness and hampering ergonomics.

FIG. 8 is a back view of the hypothetical leash accessory of FIG. 7, and corresponds with view arrows 8 of FIG. 7. FIG. 8 illustrates that blister 750 causes centroid 740 to be offset a lateral distance D and a vertical distance H from a center 800 of strap 720. The lateral distance D offsetting the centroid 740 from the center 800 means that even at rest without any motion, the weight W of the accessory applies a torque resulting in a tendency to rotate the leash in direction R1. This torque must be continually resisted by a handler of the leash, or the torque will undesirably cause the leash to twist. Furthermore, the vertical distance H offsetting the centroid 740 from the center 800 means that whenever the accessory 700 is moved to the left or the right, it swings to the left or right in directions R2. This dynamic motion also must be resisted by the handler, causing the handler to waste time and energy fighting with the leash. It also imparts undesirable harmonic movement patterns to the leash. This dynamic motion reduces the ability of the handler to perform tactile detection of the movement of the animal being handled, and can cause the animal to misinterpret the handler's attempts to fight the leash as a command. In circumstances where the handler must direct their vision away from the animal, such as when crossing a busy street, the lack of tactile responsiveness can reduce a reaction time of the handler, increasing danger to both the animal and the handler.

With a foundational understanding of the physics of article dispenser 130 in relation to the hypothetical leash accessory provided above, further discussion provides methods and alternative embodiments of the systems discussed herein.

Illustrative details of the operation of leash 100 will be discussed with regard to FIG. 9. Assume, for this embodiment, that a handler has coupled the leash to a collar of a domestic animal (e.g., a dog, cat, goat, cow, horse, guinea pig, etc.), and is about to control the domestic animal during a walk or run. The handler proceeds to hold a handle of the leash 100, and the handler and animal separate until the leash 100 becomes taut.

Figure 9:
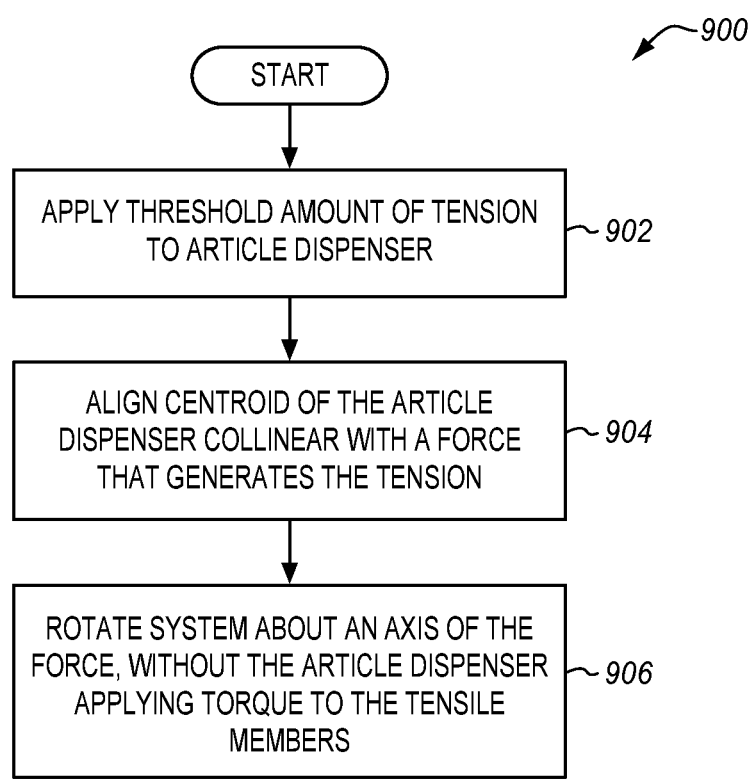
FIG. 9 is a flowchart illustrating a method of operating a leash that includes an integrated article dispenser in an illustrative embodiment.

FIG. 9 is a flowchart illustrating a method 900 for operating a leash 100 having an integrated article dispenser in an illustrative embodiment. The steps of method 900 are described with reference to leash 100 of FIG. 1, but those skilled in the art will appreciate that method 900 may be performed in other systems. The steps of the flowcharts described herein are not all inclusive and may include other steps not shown. The steps herein may also be performed in an alternative order.

According to method 900, step 902 includes applying a threshold amount of tension to the article dispenser 130. While the article dispenser 130 is held taut, the article dispenser 130 bears tension from the tensile member 110 and the tensile member 120. As soon as a threshold amount of tension (e.g., half a pound of force, one pound of force, five pounds of force, etc., depending on the weight of the article dispenser and the leash) is borne by the article dispenser 130, the tension overcomes the weight of the article dispenser 130, lifting the article dispenser 130. The article dispenser 130 continues to rise until it is held taut between tensile member 110 and tensile member 120.

In step 904, the centroid 340 of the article dispenser 130 is aligned with a force that generates the tension (e.g., force F of FIG. 2.). The alignment is caused by the application of tension. That is, the article dispenser 130 is dimensioned such that its centroid 340 is driven in-line with forces applying tension to the tensile members 110 and 120 whenever a threshold amount of tension (or more) is applied to the article dispenser 130 via the tensile members 110 and 120. Thus, unlike a free-hanging attachment to a leash, which is likely to swing, jump, or twist in response to applied tension, tensile forces applied to the leash 100 are transferred through the article dispenser 130, where they increase the alignment of the article dispenser 130 with the tensile members 110 and 120.

In step 906, the handler rotates the leash 100 (i.e., the system comprising tensile members 110 and 120, as well as article dispenser 130) about the axis of the forces F generating the tension. This may be performed by the handler rotating their hand at the wrist, which rotates the leash 100 in direction R about the axis of force F depicted in FIG. 2. Because the centroid 340 of the article dispenser 130 is collinear with the forces creating the tension, the article dispenser 130 freely rotates with the tensile members 110 and 120. Thus, unlike accessories that exhibit centroids which are not aligned with forces that apply tension to a leash, rotation of the leash 100 does not cause the article dispenser 130 to apply torque to or otherwise twist the tensile members 110 and 120 in an attempt to return to a rest position. This enhances responsiveness of the leash to an animal handler, and prevents an animal handler from having to fight the leash 100 when the leash is axially rotated to different positions.

Method 900 provides a substantial advantage over prior techniques because it enables a handler of a leash to easily access dispensable articles via an integrated article dispenser, and to do so without compromising a desired level of responsiveness of the leash. This in turn enables faster tactile detection of animal handling, and faster correction of animal behavior, which is highly desirable when attempting to reinforce animal behavior.

Figure 10:
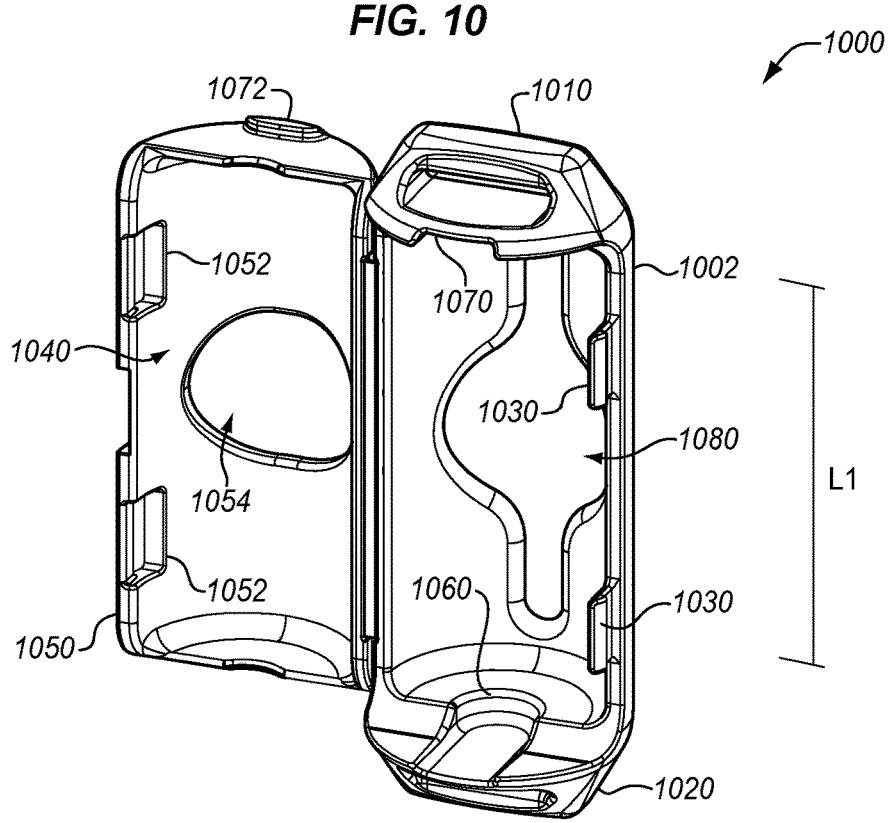
FIGS. 10-13 are views of an article dispenser that is open for removal and reloading of articles in an illustrative embodiment.

FIGS. 10-13 are views of an article dispenser 1000 having an opened hatch 1050 for removal and reloading of articles in an illustrative embodiment. FIG. 10 illustrates that article dispenser 1000 includes housing 1002, which is coupled with tensile members via a first end 1010 and a second end 1020. Each of the ends is in the form of a loop, which means that the article dispenser 1000 is capable of rotatable attachment to tensile members. Housing 1002 includes slots 1060 and 1070, which are dimensioned to receive and retain ends of a spindle (e.g., spindle 1110 of FIG. 11) that holds articles such as sanitary bags. Slots 1060 and 1070 are dimensioned to hold a central axis of the spindle collinear with forces that apply tension to a leash, and are rounded at their ends to enable the spindle to rotate freely while in the housing 1002. That is, the spindle is oriented by the slots 1060 and 1070 such that its central axis is collinear with forces which are applied to tensile members in order to place a leash in tension. In further embodiments, other features such as spring-loaded pins, prongs, etc. may be utilized to retain the spindle in its desired position. Thus, even when loaded with articles, partially loaded with articles, or empty, the centroid of the article dispenser 1000 still aligns collinear with tensile forces applied to a leash. The use of a spindle therefore facilitates alignment and weight distribution of articles retained within the article dispenser. Furthermore, the ability to freely rotate the spindle facilitates the ease with which a cylinder of sanitary bags may be rolled backwards or forwards. This enables articles to be positioned in orientations that make them more easy to dispense, which enhances the ergonomics of dispensing the articles.

An opening 1080 enables a user of the article dispenser 1000 to access and retrieve articles from the spindle. In this embodiment, the articles comprise sanitary bags, and the opening has a length L1 that approximately corresponds with an axial length L3 of the spindle 1110 occupied by each sanitary bag.

Housing 1002 further includes prongs 1030, which couple with receptacles 1052 to secure hatch 1050 in place when hatch 1050 is closed. Hatch 1050 defines a second opening 1054 for accessing an internal volume of the housing. The second opening 1054 permits access to the stored articles at a different radial position than the opening 1080, such that pinching the stored articles between the opening 1080 and the second opening 1054, and rotating the stored articles, causes the spindle 1110 storing the articles to rotate.

Hatch 1050 also includes embosses (e.g., emboss 1072) for covering the slots. Upon opening the hatch 1050 as shown in FIG. 10, an entirety of the internal volume of the article dispenser 1000 is exposed for receiving new articles. In embodiments wherein new articles are pre-wrapped onto a spindle to form a cylinder, this enables the entire cylinder to be quickly swapped out and replaced.

Figure 11:
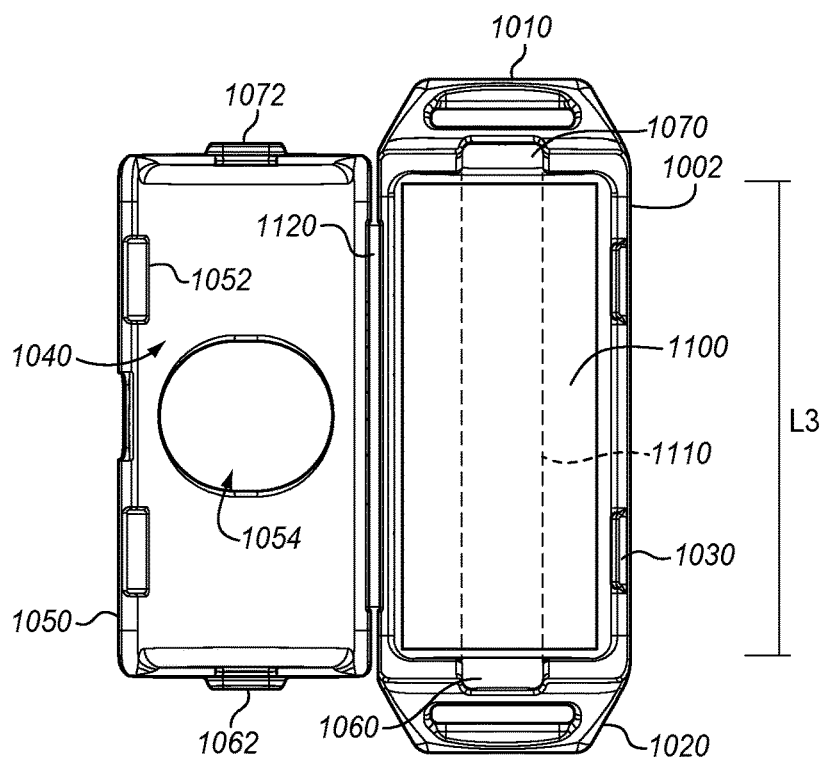
Figure 12:
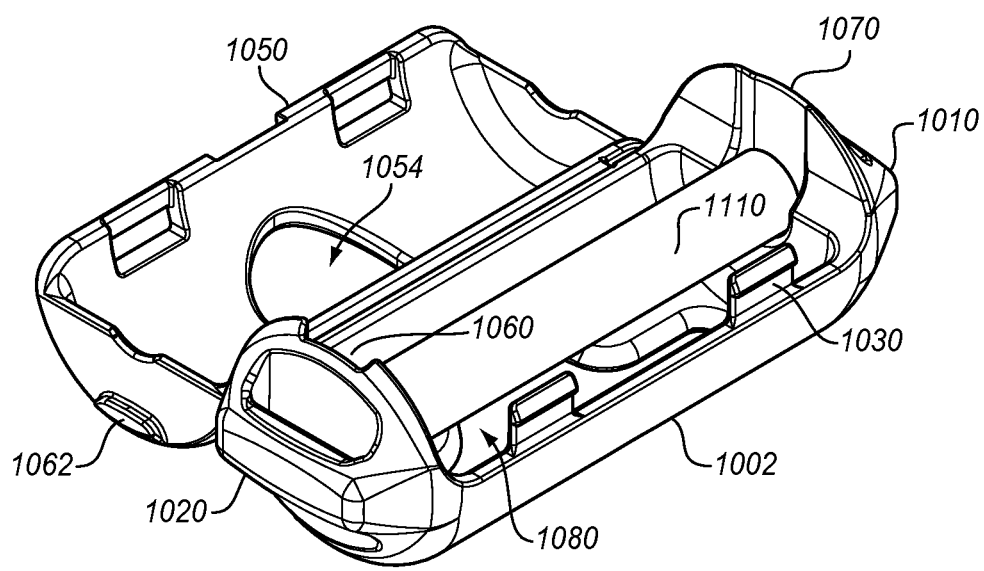
Figure 13:
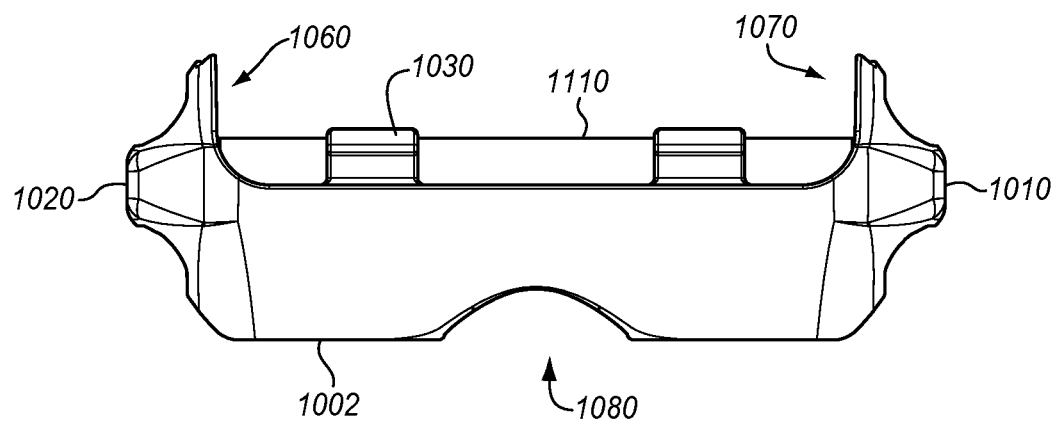

In FIG. 11, a cylinder 1100, comprising many sanitary bags wrapped around a spindle 1110, has been loaded into the article dispenser 1000. Ends of the spindle 1110 are nested into the slots 1060 and 1070 of the housing 1002. In FIG. 12, the sanitary bags have been used, leaving the spindle 1110 exposed. By opening the hatch 1050 and inverting the housing 1002, the spindle 1110 drops out of the internal volume without a need for a handler to manually insert their fingers into the housing 1002. This feature enables the size of the housing to remain small. FIG. 13 illustrates the empty spindle 1110 within the housing 1002 from another angle.

With an in-depth discussion of an illustrative article dispenser provided above, further discussion focuses upon additional illustrative embodiments of leashes having integrated article dispensers. Various features described herein with regard to these embodiments may be interchangeably used within further variations of leashes having integral article dispensers, as desired. The various leashes described below may be modified to use cords, ropes, chains, webbing, linkages, other tensile members (i.e., members capable of applying and bearing tension), or combinations thereof as desired.

Figure 14:
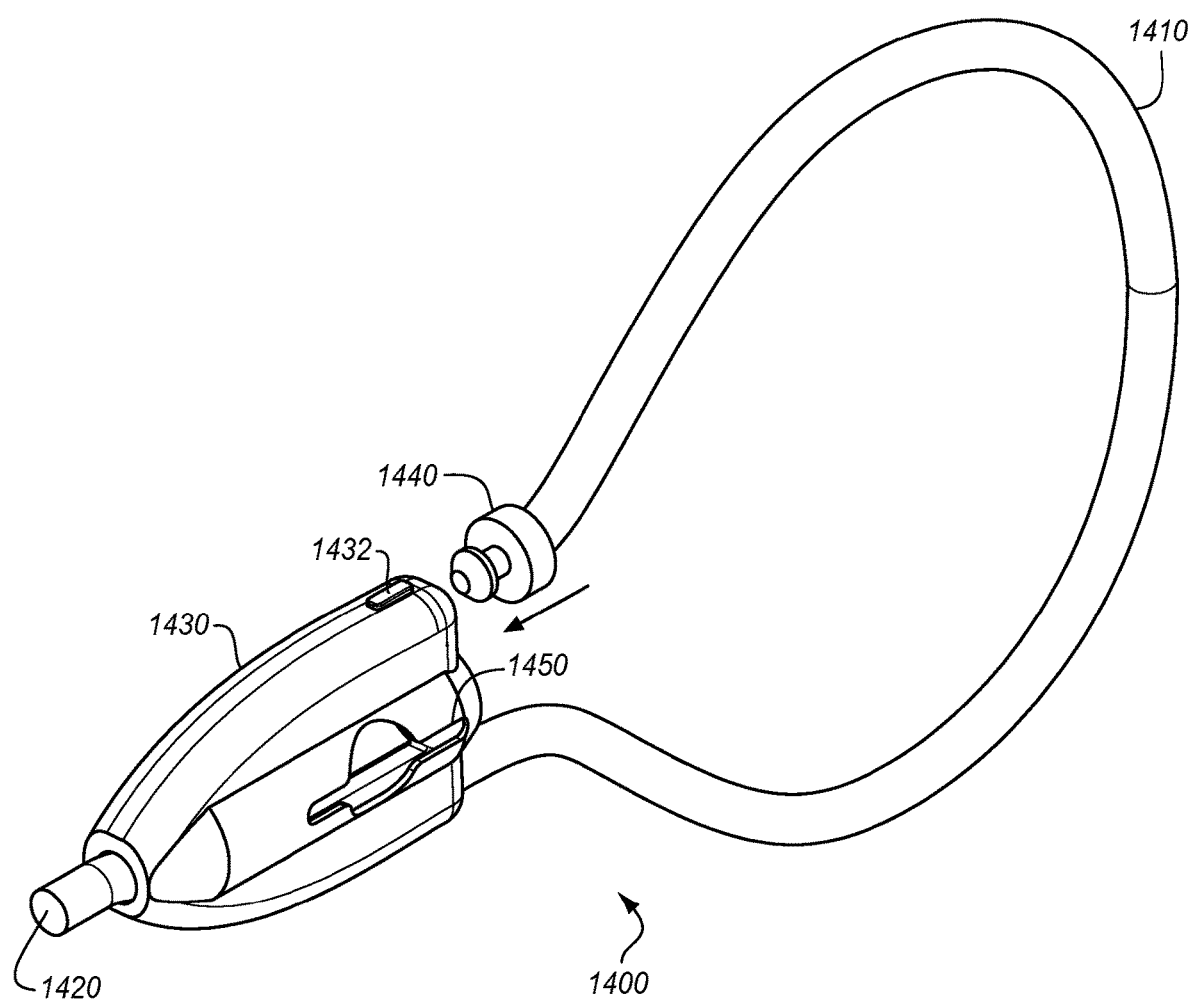
FIGS. 14-15 are views of a leash that includes an integrated article dispenser in a second illustrative embodiment.
Figure 15:
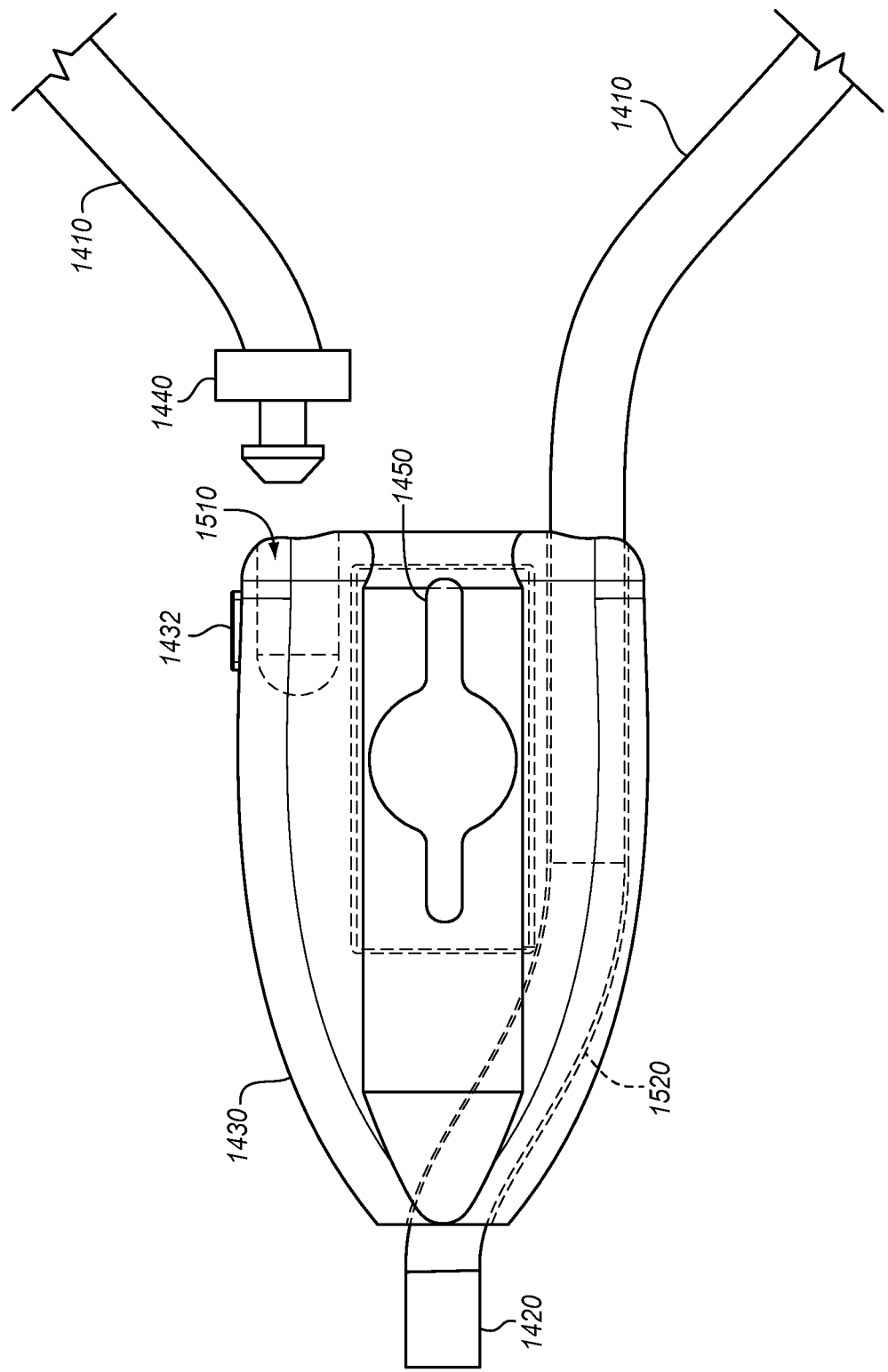

FIGS. 14-15 are views of a leash 1400 that includes an integrated article dispenser 1430 in a second illustrative embodiment. In this embodiment, the article dispenser 1430 has a triangular shape, and includes a housing 1450 that defines a cylindrical inner volume for receiving and storing articles. A first tensile member 1420 is attached to a narrow end of the article dispenser 1430, while a second tensile member 1410 forms a loop having an end 1440 that is removably coupled via a button 1432 with the article dispenser 1430. This enables the tensile member 1410 to be looped around a tree or post and re-secured.

FIG. 15 illustrates that the end 1440 inserts into a recess 1510 within the article dispenser 1430, and is held in position by a protrusion (not shown) that is coupled with the button 1432. FIG. 15 further illustrates that a single cord passes through a hollow portion 1520 of the article dispenser 1430, to define both the first tensile member 1410 and the second tensile member 1420. In short, a single cord forms the first tensile member, is affixed to the narrow end of the housing, and continues from the wide end of the housing to form the second tensile member.

Figure 17:
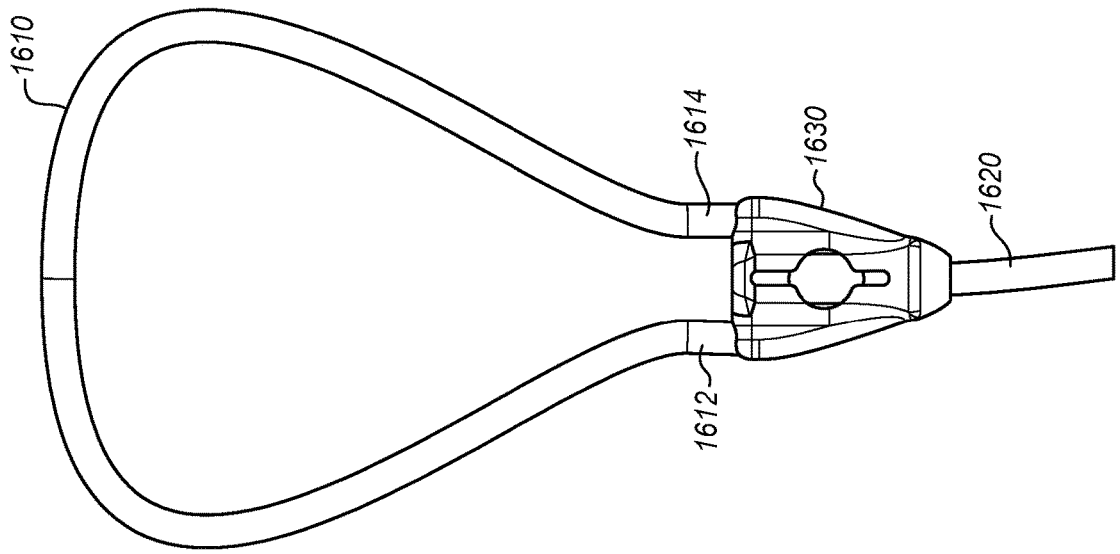
FIGS. 16-17 are views of a leash that includes an integrated article dispenser in a third illustrative embodiment.
Figure 16:
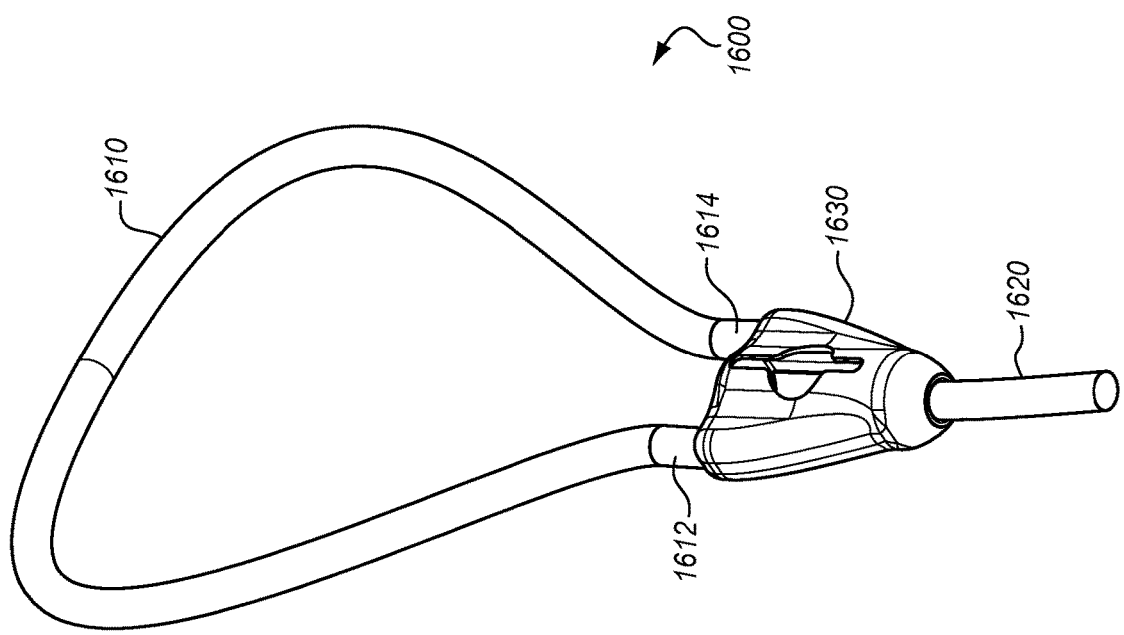

FIGS. 16-17 are views of a leash 1600 that includes an integrated article dispenser 1630 in a third illustrative embodiment. In this embodiment, a first cord 1610 is affixed to the article dispenser 1630 to form a handle having ends 1612 and 1614. In this embodiment, the ends 1612 and 1614 of the first cord 1610 are affixed within corresponding holes in the wide end of the article dispenser 1630. A second cord 1620 is affixed to the article dispenser and designed for coupling to an animal. The end of the second cord 1620 enters a corresponding hole in the narrow end of the article dispenser 1630, and is affixed to the article dispenser.

FIGS. 18-19 are views of a leash 1800 that includes an integrated article dispenser 1830 in a fourth illustrative embodiment. In this embodiment, a first cord 1810 includes an end 1840 that is removably attached to a receptacle 1832 in the article dispenser 1830 to form a handle, and a second cord 1820 is affixed to the article dispenser 1830 and designed for coupling to an animal.

Figure 22:
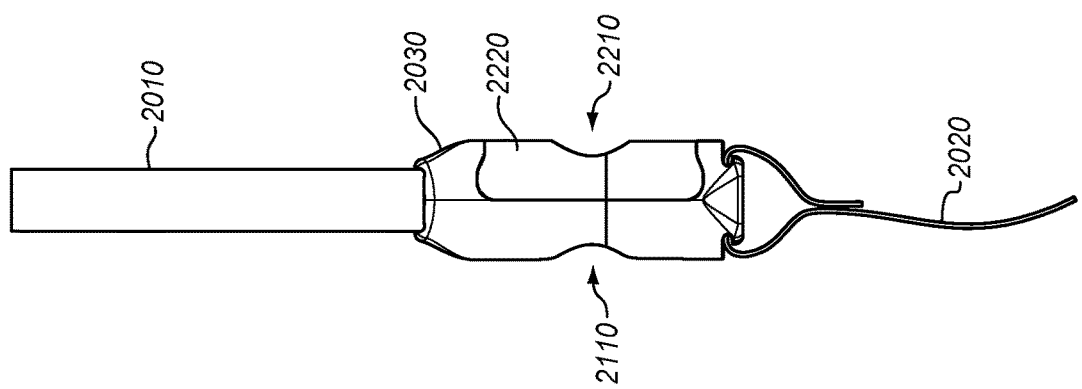
FIGS. 20-22 are views of a leash that includes an integrated article dispenser in a fifth illustrative embodiment.
Figure 21:
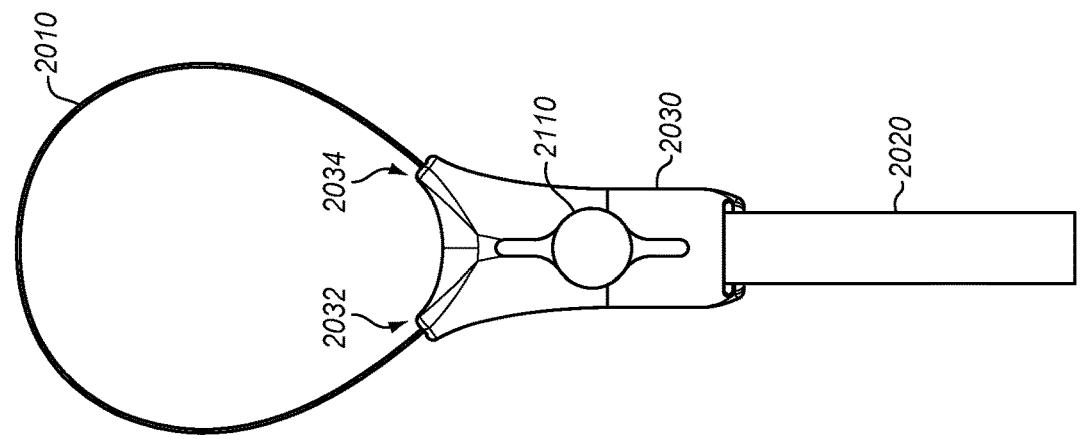
Figure 20:
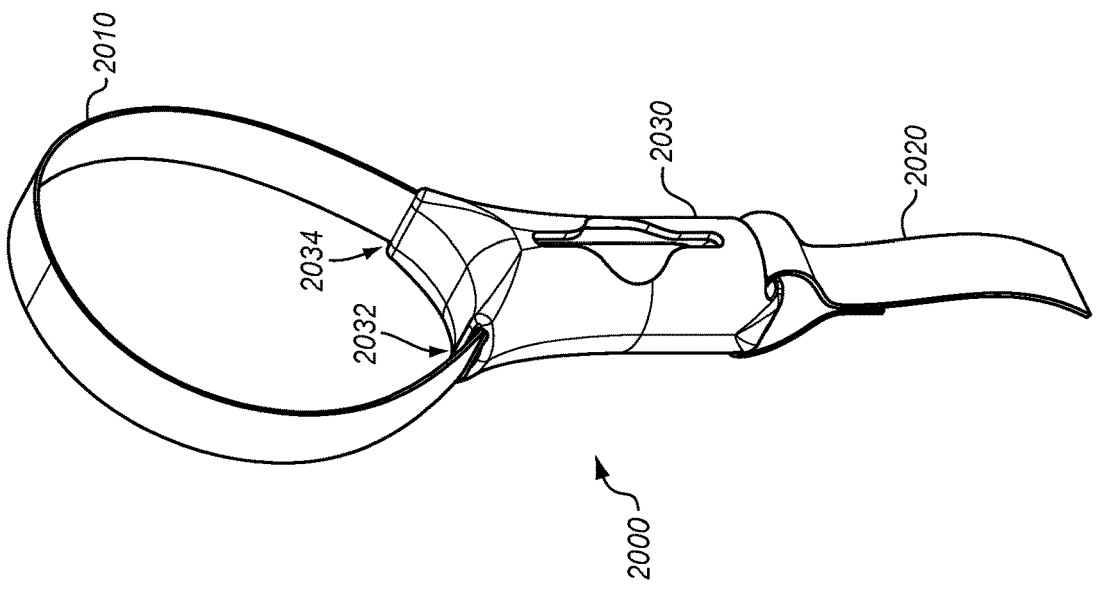

FIGS. 20-22 are views of a leash 2000 that includes an integrated article dispenser 2030 in a fifth illustrative embodiment. In this embodiment, the handle 2010 is formed from flat webbing having portions that are retained within channels 2032 and 2034 of the article dispenser 2030. The handle 2010 may comprise a single loop of webbing, or a length of webbing wherein each end of the length of webbing terminates in one of the channels. Webbing 2020 loops through an end of the article dispenser, and is designed for coupling to an animal. FIG. 21 further depicts an opening 2110 to an internal volume for storing articles, and FIG. 22 illustrates a second opening 2210 within a hatch 2220. The hatch 2220 facilitates removal and handling of articles stored in the article dispenser 2030. In one embodiment, the hatches discussed herein forego the use of hinges, and comprise removable panels that snap into place.

FIGS. 23-24 are views of a leash 2300 that includes an integrated article dispenser 2330 in a sixth illustrative embodiment. In this embodiment, the handle 2310 includes a clip, made from members 2362 and 2364, that separates the handle 2310 into two components. This enables the handle 2310 to be separated, placed around a post, and then re-formed into a loop to secure the leash in place. The members may comprise any suitable clipping mechanism, such as a carabiner or other type of shackle, a receptacle and pin, etc. The handle 2310 is attached to a coupling 2340 (e.g., a rigid piece of metal or plastic), which is attached to a member 2350 (e.g., a rigid member, or a cord), which is itself attached to the article dispenser 2330. Cord 2320 is affixed to the article dispenser 2330 and designed for coupling to an animal.

Figure 25:
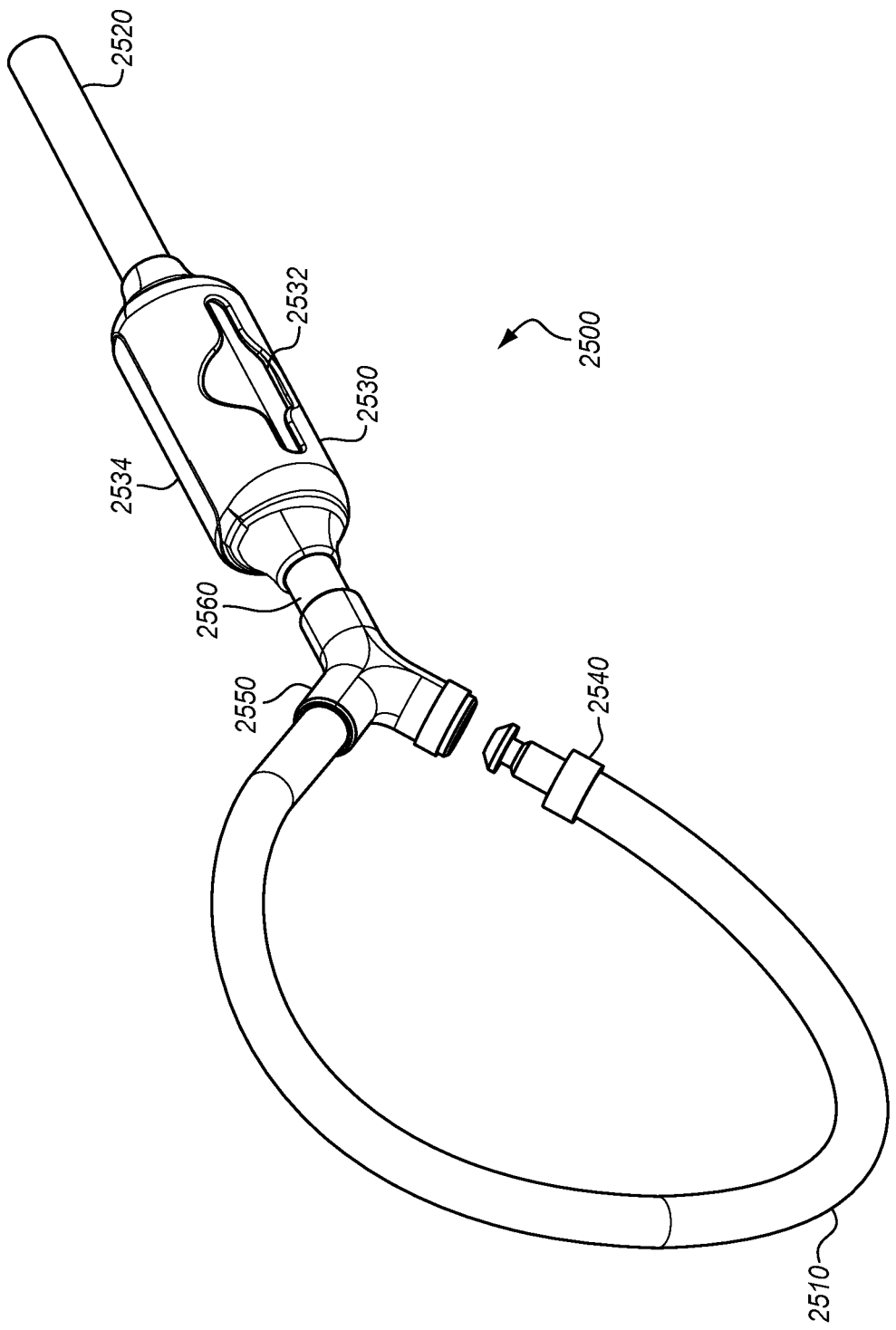
FIGS. 25-26 are views of a leash that includes an integrated article dispenser in a seventh illustrative embodiment.
Figure 26:
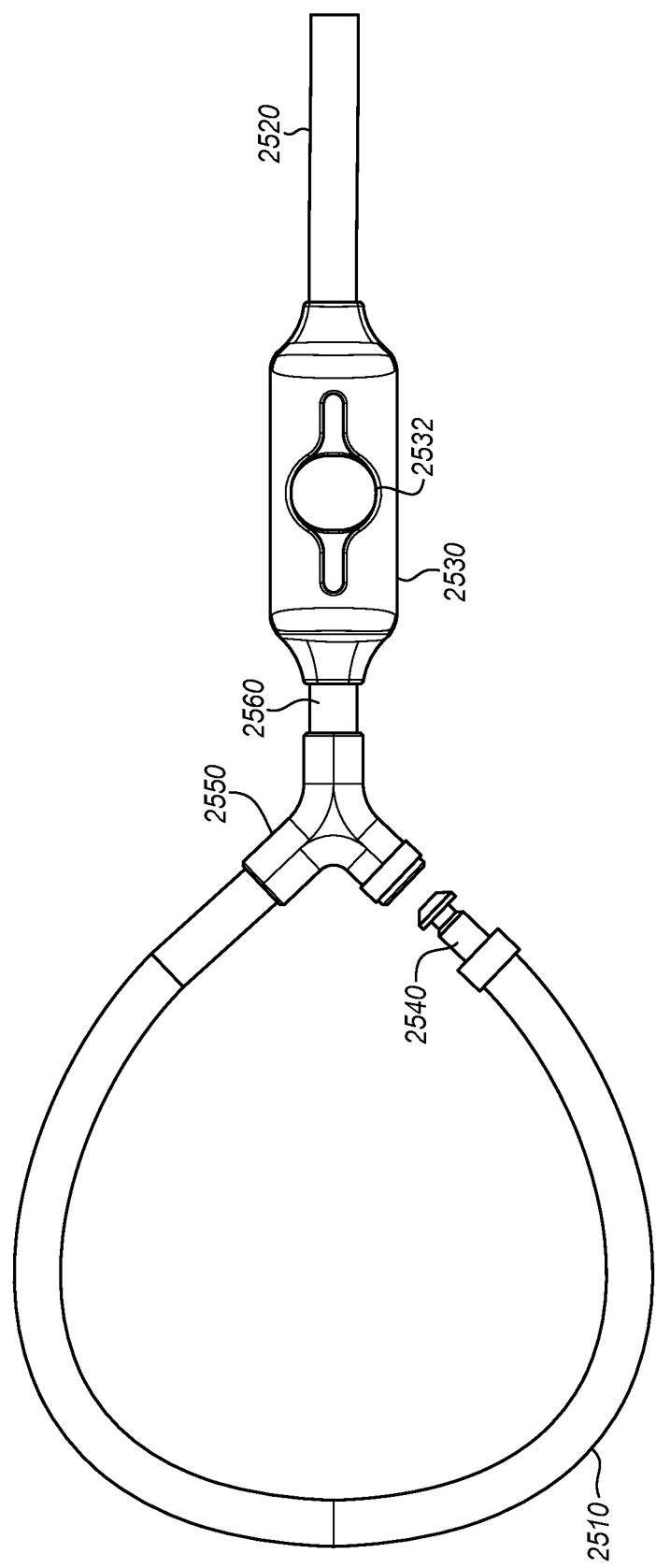

FIGS. 25-26 are views of a leash 2500 that includes an integrated article dispenser 2530 in a seventh illustrative embodiment. In this embodiment, a first cord 2510 forms a loop. One end of the loop is fixedly attached to coupling 2550, which is attached via member 2560 to the article dispenser 2530. Another end 2540 of the loop is removably attached to the coupling 2550. A second cord 2520 is affixed to the article dispenser 2530 and designed for coupling to an animal. FIG. 25 further depicts an opening 2532 to an inner volume for storing articles, as well as a hatch 2534, and FIG. 26 provides a new view of the leash 2500.

Figure 28:
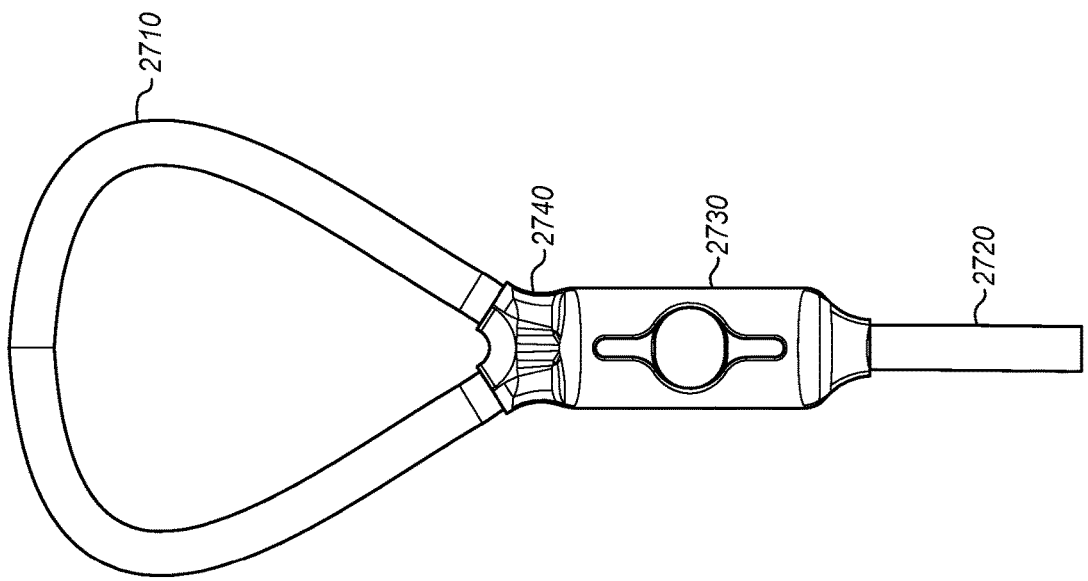
FIGS. 27-28 are views of a leash that includes an integrated article dispenser in an eighth illustrative embodiment.
Figure 27:
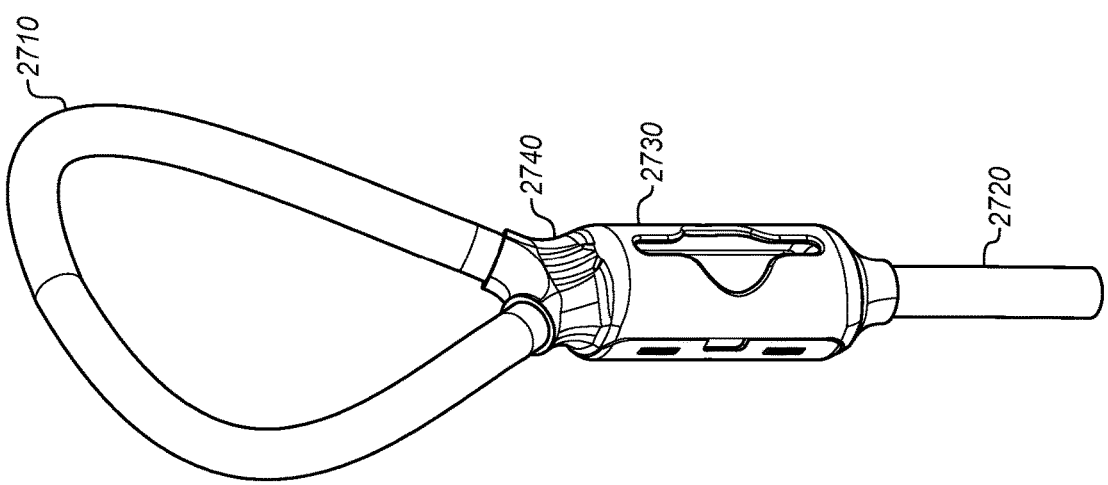

FIGS. 27-28 are views of a leash 2700 that includes an integrated article dispenser 2730 in an eighth illustrative embodiment. In this embodiment, a first cord 2710 is affixed to a spur 2740 of the article dispenser 2730 to form a handle, and a second cord 2720 is affixed to the article dispenser 2730 and designed for coupling to an animal.

Figure 30:
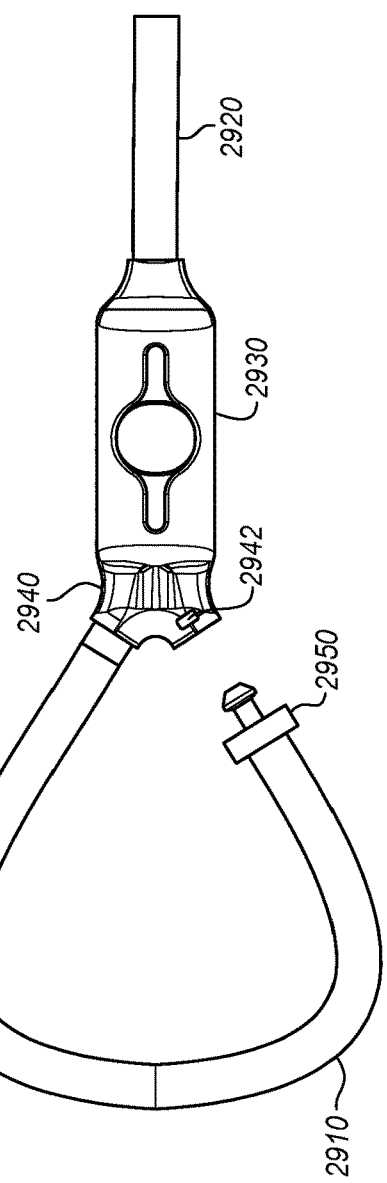
FIGS. 29-30 are views of a leash that includes an integrated article dispenser in a ninth illustrative embodiment.
Figure 29:
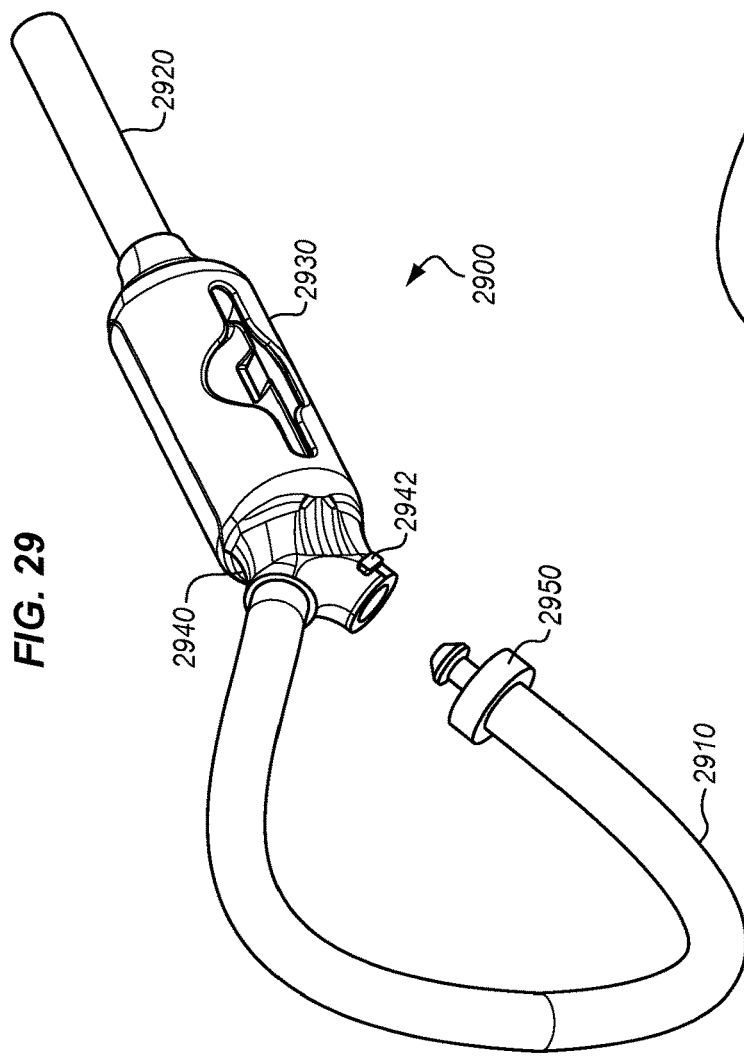

FIGS. 29-30 are views of a leash 2900 that includes an integrated article dispenser 2930 in a ninth illustrative embodiment. In this embodiment, a first cord 2910 includes an end 2950 that is removably attached to a spur 2940 of the article dispenser 2930 to form a handle. The end 2950 may be released from the spur 2940 by pressing button 2942. The leash 2900 also includes a second cord 2920 is affixed to the article dispenser and designed for coupling to an animal.

Figure 31:
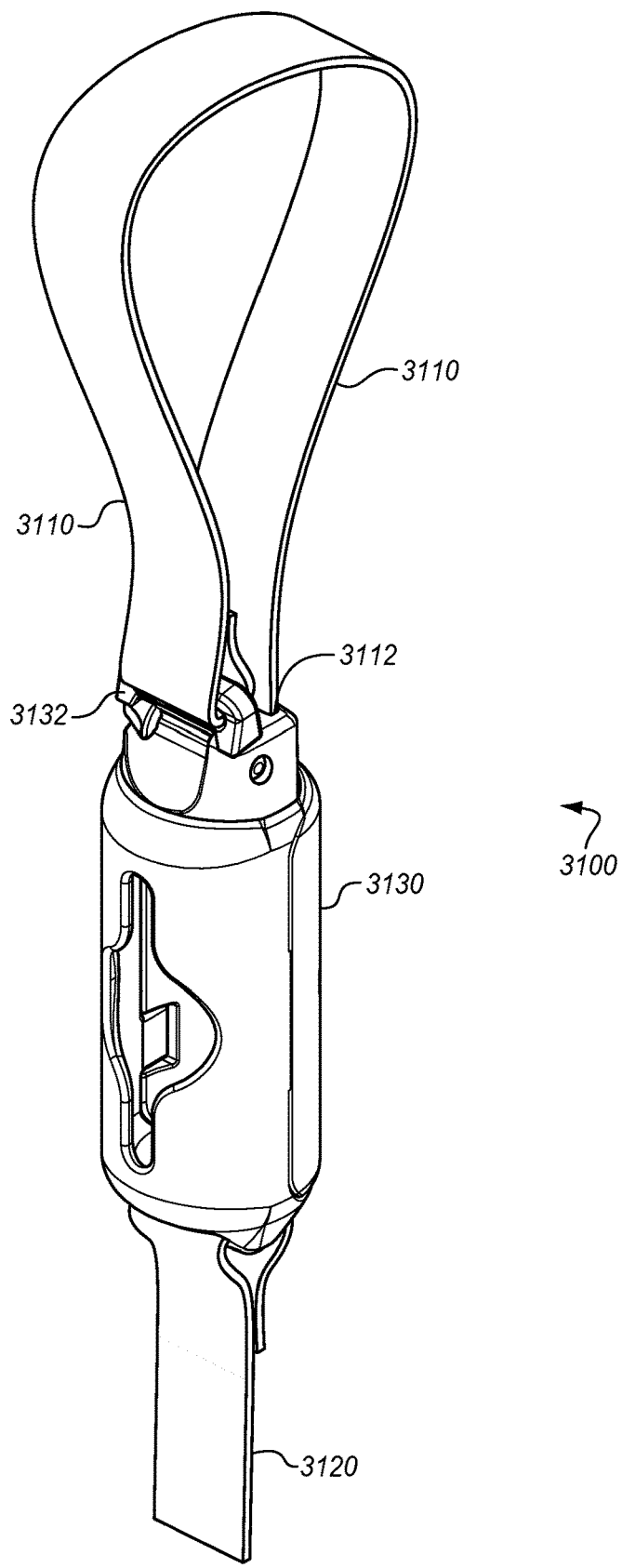
FIG. 31 is a perspective view of an article dispenser that includes an integral clip for receiving a handle in an illustrative embodiment.

FIG. 31 is a perspective view of an article dispenser 3100 that includes an integral clip 3132 for receiving a handle in an illustrative embodiment. In this embodiment, the article dispenser 3100 is coupled with a strap 3120 and a strap 3110. Strap 3120 has one end that forms a loop around an end of the article dispenser. Strap 3110 includes one end that is affixed to slot 3112 in the article dispenser 3100, and strap 3110 includes another end that is looped around the integral clip 3132. The integral clip 3132 enables the strap 3110 to be slipped into place, and may include a spring-loaded bar (not shown) that slips to enable easy entry of the strap 3110, and then springs back into place to retain the strap (i.e., similar to a spring-loaded clasp).

Figure 32:
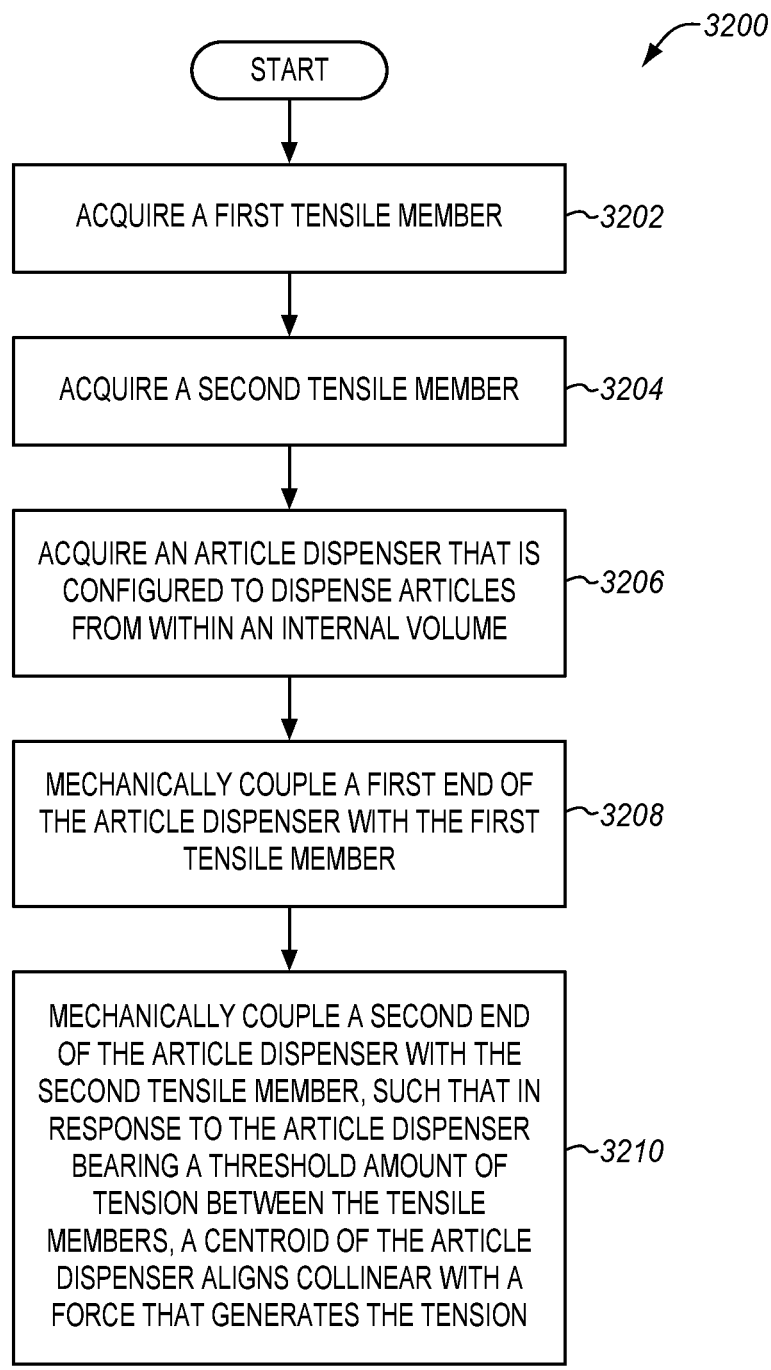
FIG. 32 is a flowchart illustrating a method of assembling a leash that includes an integrated article dispenser in an illustrative embodiment.

With a discussion of a variety of leash systems discussed above, the next section describes a method of fabrication of a leash. FIG. 32 is a flowchart illustrating a method 3200 of assembling a leash that includes an integrated article dispenser in an illustrative embodiment.

In step 3202, a first tensile member is acquired, and in step 3204, a second tensile member is acquired. The tensile members may comprise cords, webbing, chain, bars, etc. In step 3206, an article dispenser is acquired that is configured to dispense articles from within an internal volume. For example, an article dispenser described above may be acquired.

In step 3208, a first end of the article dispenser is coupled with the first tensile member, and in step 3210, a second end of the article dispenser is coupled with the second tensile member. This may comprise inserting an end of a tensile member into a corresponding receptacle at the article dispenser, gluing or welding a portion of the tensile member to form a loop around an end of the article dispenser, physically interlocking the article dispenser with the tensile member by looping a portion of the tensile member around an end of the article dispenser, etc.

Once the tensile members have been coupled to the article dispenser to form a leash, the design of the article dispenser and the locations of attachment of the tensile members thereto result in a physical system wherein whenever the article dispenser bears a threshold amount of tension between the tensile members, a centroid of the article dispenser aligns collinear with a force that generates the tension. This technique for assembly provides a technical benefit by enabling the fabrication of leashes with integral article dispensers that are both ergonomic and responsive.

Figure 33:
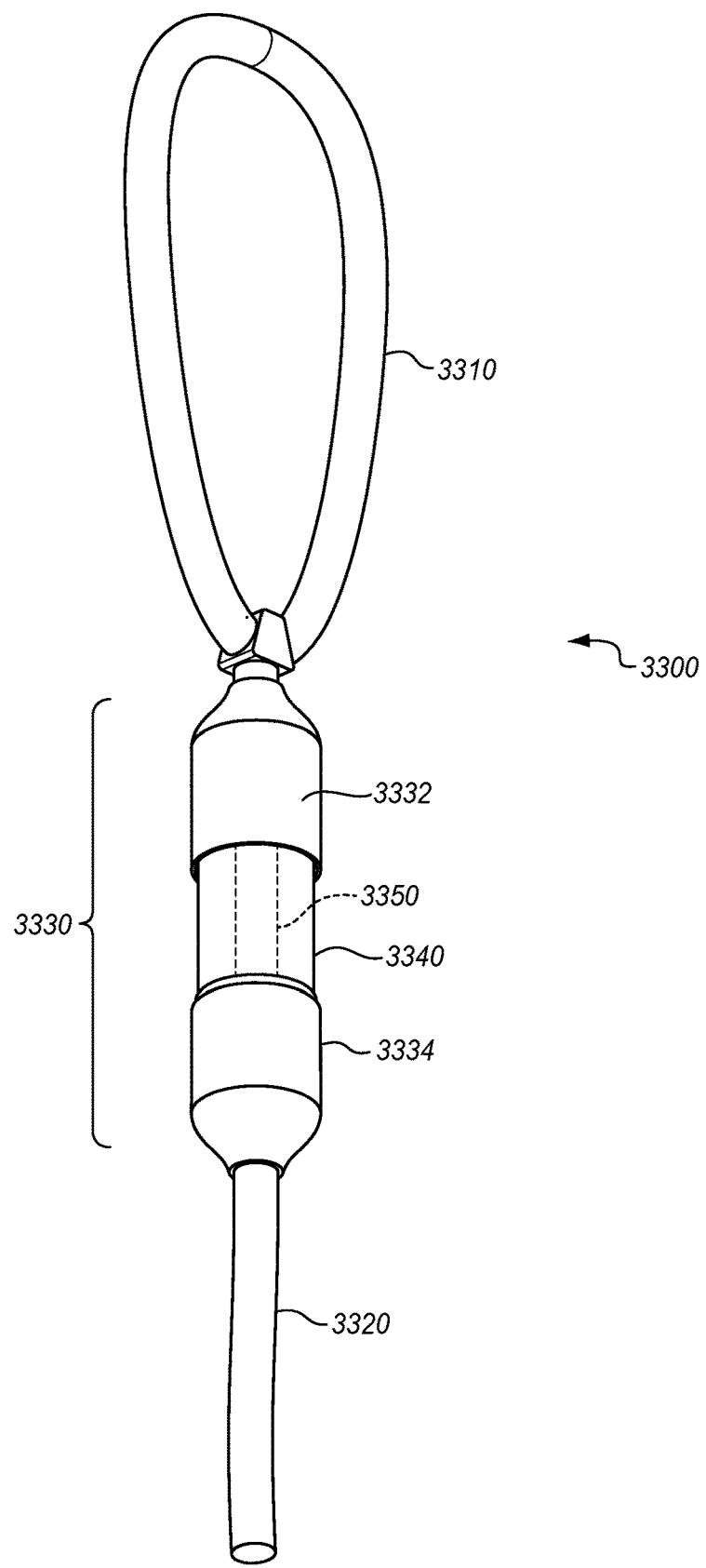
FIGS. 33-35 illustrate a further leash with an integrated article dispenser in an illustrative embodiment.
Figure 34:
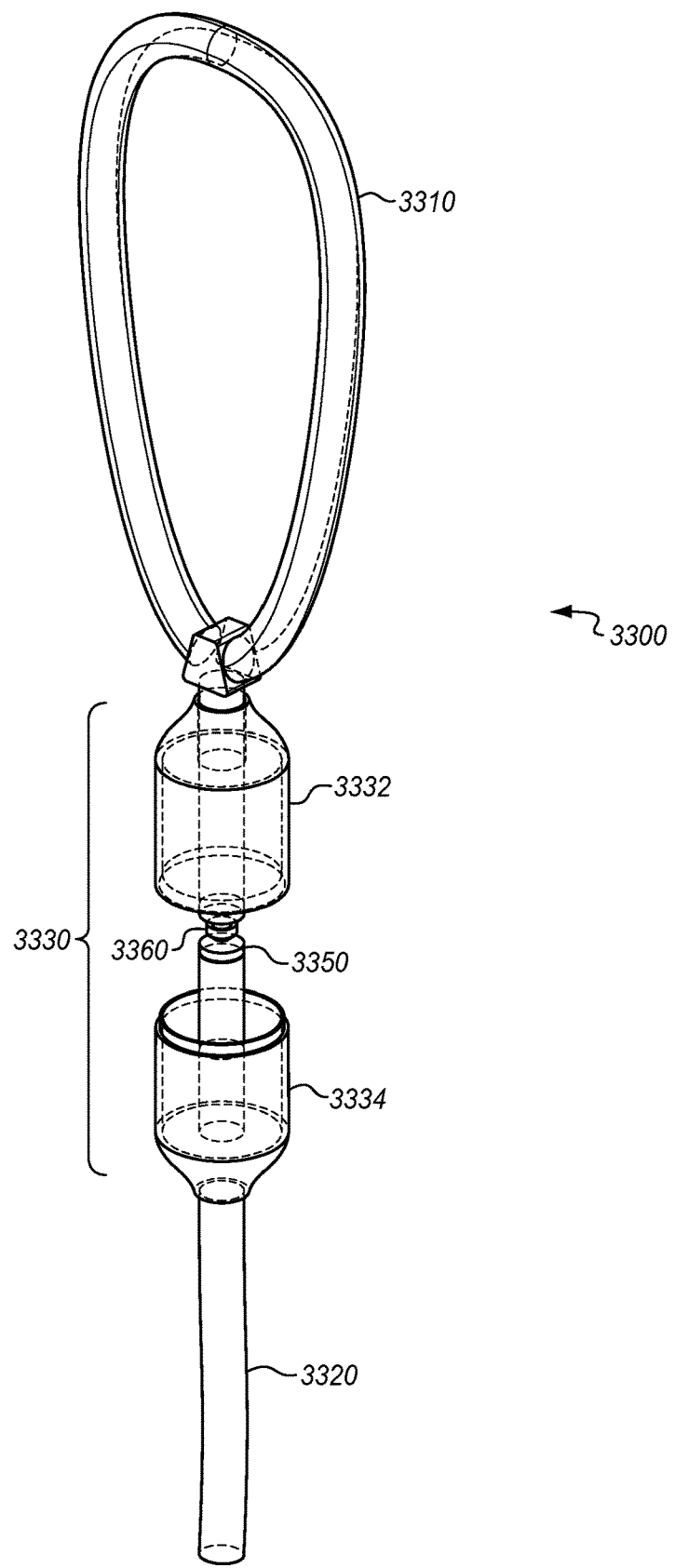
Figure 35:
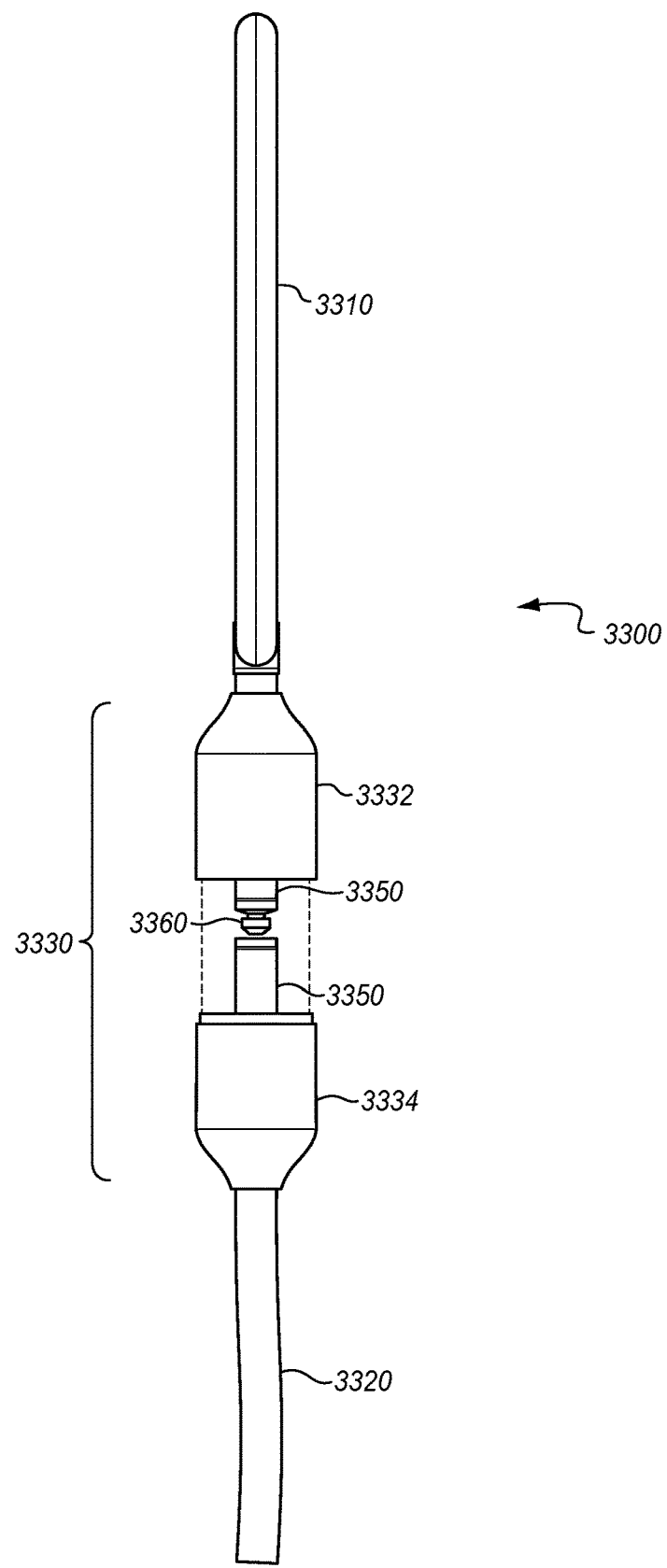

FIGS. 33-35 illustrate a further leash 3300 with an integrated article dispenser in an illustrative embodiment. In this embodiment, the leash 3300 includes a first tensile member 3310 in the form of a loop-shaped handle. The leash 3300 also includes a second tensile member 3320, and an article dispenser 3330. The article dispenser 3330 includes a first housing 3332 that is affixed to the first tensile member 3310, and includes a first hollow end that faces away from the first tensile member 3310. The article dispenser further includes a second housing 3334 having a second hollow end facing the first hollow end of the first housing 3332. The hollow ends are dimensioned to hold a group of articles (e.g., a spindle of sanitary bags), which leaving portions of the articles exposed to facilitate manual access. The second housing 3334 is attached to the second tensile member 3320. The housings are coupled via an inner member 3350, such as a rigid two-piece bar, or a length of second tensile member 3320. The articles 3340 are wrapped around the inner member 3350, or are wrapped around a spindle covering the inner member 3350.

In the see-through view presented in FIG. 34, the inner member 3350 is clearly visible, as is a coupling 3360 in the form of an attachment point that enables a removable attachment of the housing 3332 to the housing 3334. The coupling may comprise a channel and matching protrusion that mate together and interlock as shown in FIG. 35, or may comprise other interlocking components (e.g., matching loops and carabiners, etc.). In further embodiments, inner member 3350 comprises two pieces having complementary threading, which enables the pieces to be screwed together in order to unite the housing 3332 and the housing 3334. In still further embodiments, the inner member 3350 is foregone, and each housing includes complementary threading (e.g., one includes male threading, and another includes female threading of the same pitch and diameter). The housings may then be screwed together to secure articles, or unscrewed to access the articles.

The coupling 3360 enables the inner member 3350 to be separated into two parts, which allows for a hollow spindle 3350 to be slid over the inner member 3350 and locked in place.

Figure 36:
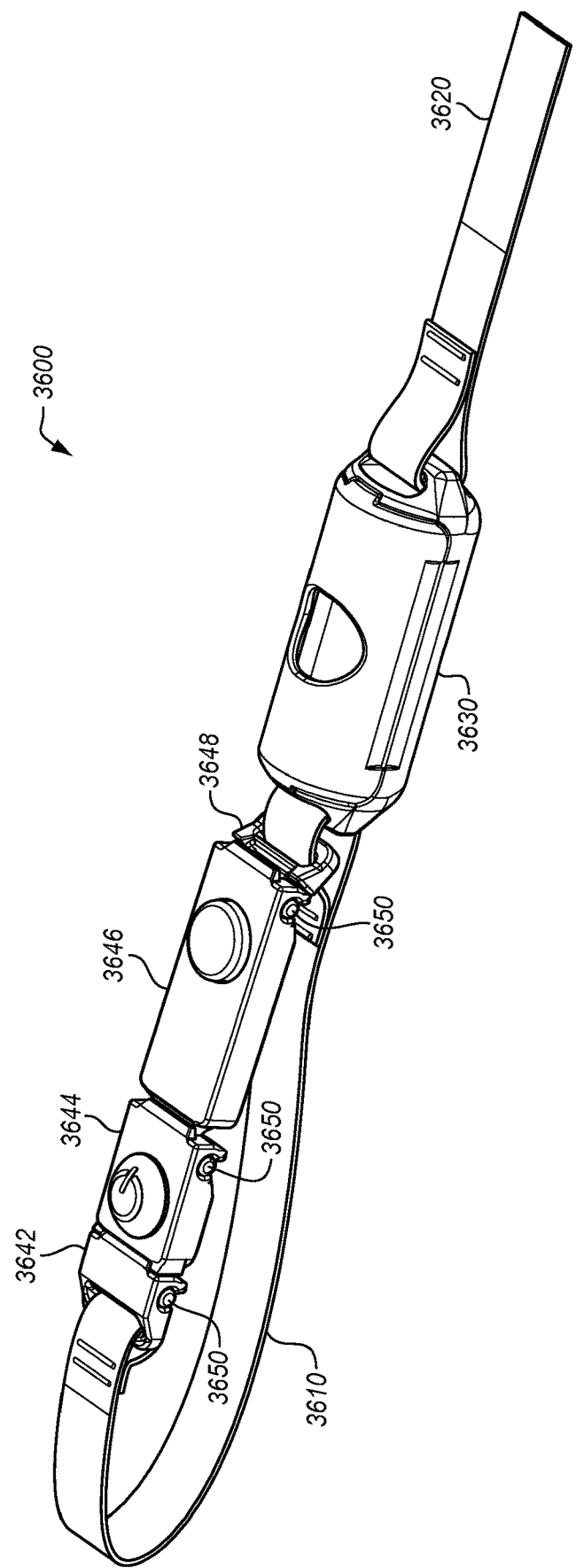
FIG. 36 is a perspective view of a leash that is extensible to include any number of accessories in an illustrative embodiment.

FIG. 36 is a perspective view of a leash 3600 that is extensible to include any number of accessories in an illustrative embodiment. The leash 3600 includes a handle 3610, an article dispenser 3630, and a further tensile member 3620. According to FIG. 36, the handle 3610 of the leash includes two removable links in the form of a light 3644 and a training clicker 3646. Each of the removable links includes a male end and a female end for integration into the handle 3610. The handle 3610 of the leash includes a female end 3642 to which the light 3644 is removably attached, and further includes a male end 3648 to which the clicker 3646 is removably attached. Any suitable number of removable links may be added together in this fashion, and any suitable type of removable links may be used, such as a clickers, lights, medication applicators (e.g., for an insect repellent collar segment), Global Positioning System (GPS) trackers, etc. As shown in FIG. 36, the end of an article dispenser 3630 is rotatably attached to the handle 3610 (i.e., a first tensile member) via a clasp. In further embodiments, the handle is removably attached to an end of the article dispenser via any of buckles, clasps, hasps, buttons, snaps, etc.

Figure 37:
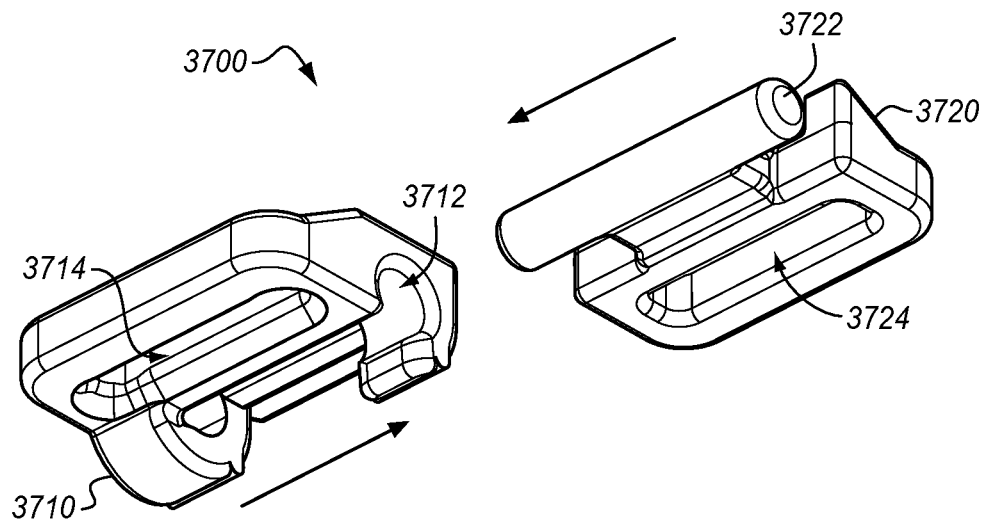
FIGS. 37-38 are perspective views of an exploded clasp for an extensible leash in an illustrative embodiment.
Figure 38:
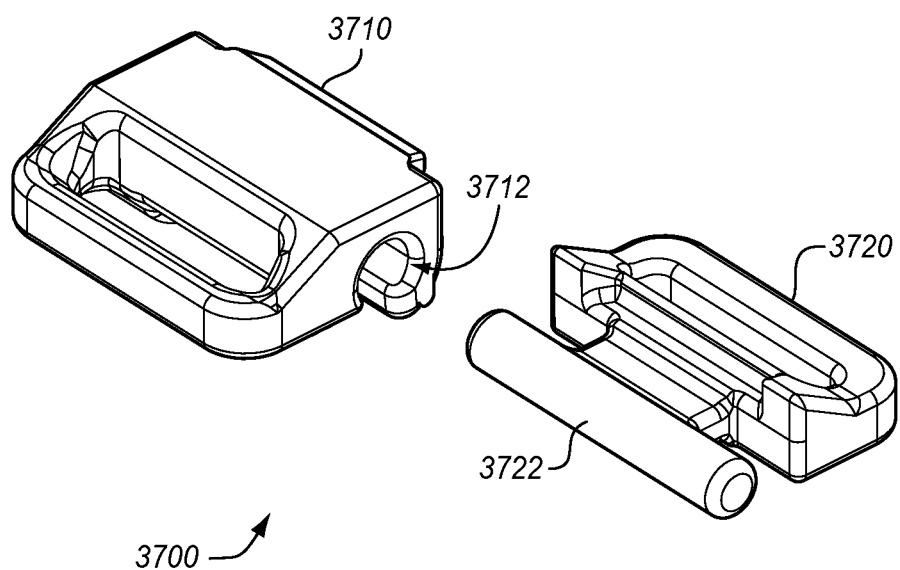

FIGS. 37-44 illustrate further details of the removable clasps of FIG. 36 in illustrative embodiments. FIGS. 37-38 are perspective views of an exploded clasp 3700 for an extensible leash in an illustrative embodiment. These FIGS.

depict a female clasp 3710 having a recess/receptacle 3712 for receiving a cylinder 3722 of a male clasp 3720. Female clasp 3710 further includes a slot 3714 for receiving a loop of webbing, and male clasp 3720 similarly includes a slot 3724 for receiving a loop of webbing.

Figure 39:
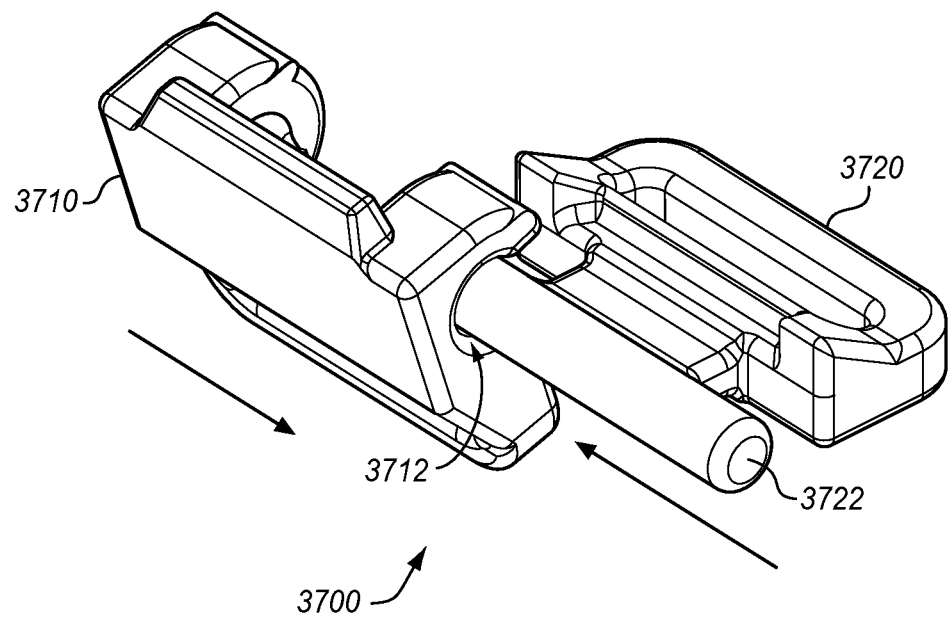
FIGS. 39-41 illustrate assembly of a clasp for an extensible leash in an illustrative embodiment.
Figure 40:
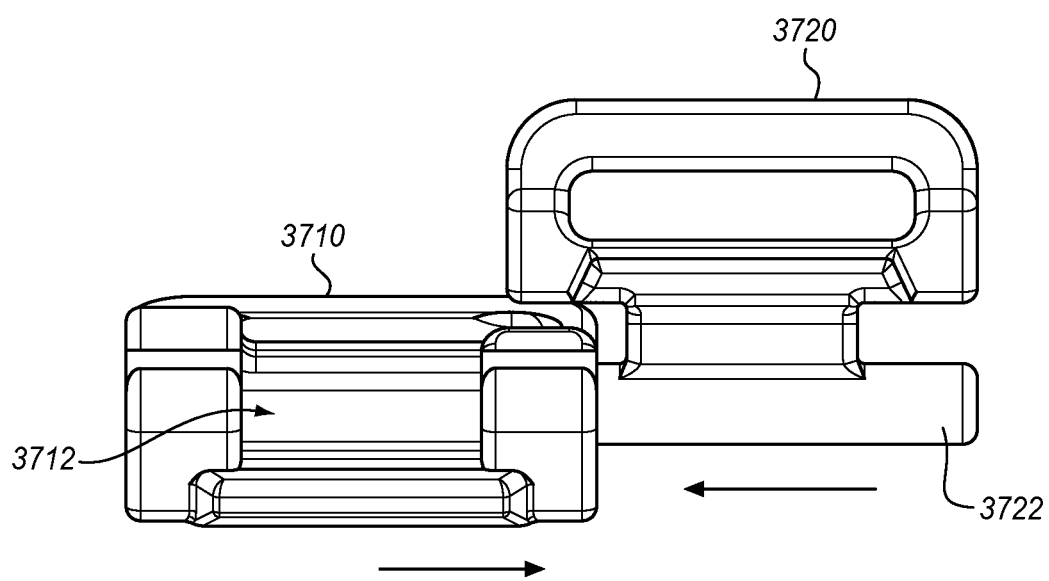
Figure 41:
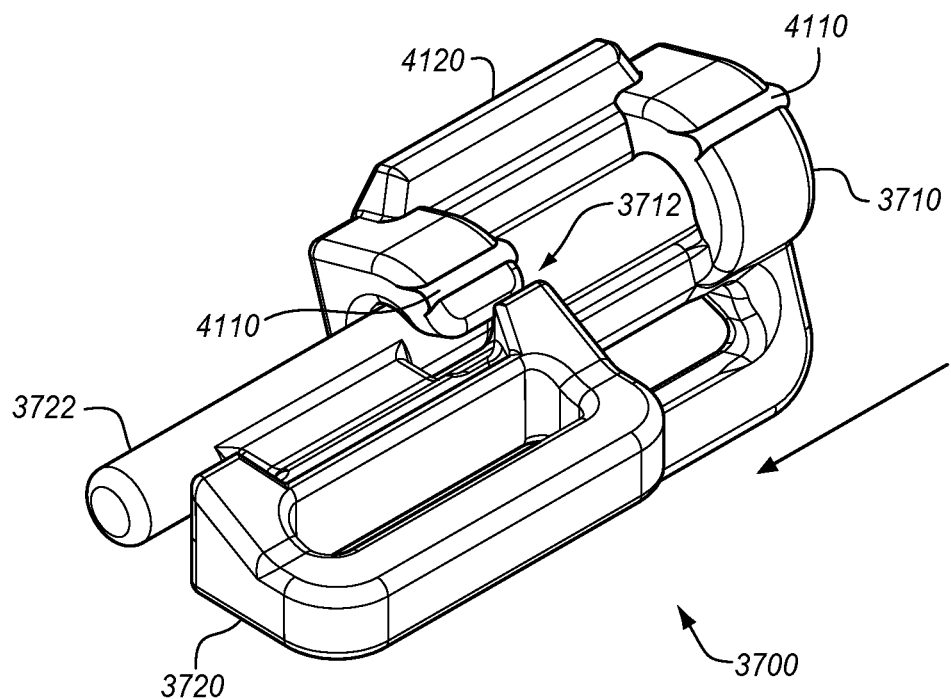

FIGS. 39-41 illustrate assembly of a clasp 3700 for an extensible leash or collar in an illustrative embodiment. In this embodiment, the cylinder 3722 is inserted into the receptacle 3712 while the clasp is in an open position. FIG. 41 illustrates further details of the clasps, depicting nubs 4110 which, after assembly, increase an amount of force required to return the clasp to a fully open position where it can be disassembled. In this embodiment, the nubs 4110 are built into the clasp directly. However, in further embodiments the nubs are added to the clasp later as an additional component. The arrangement depicted in FIGS. 39-41 also permits free rotation of the clasp prior to contact with a nub. A ledge 4120 prevents the clasp 3700 from overextension/rotation when the clasp is closed, and enables easy access and manipulation of the clasp via a finger.

Figure 42:
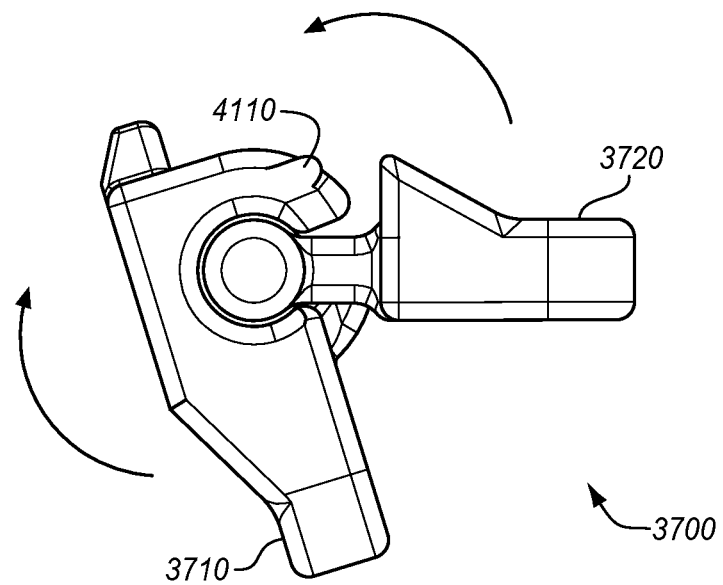
FIGS. 42-44 are views of an assembled clasp for an extensible leash in an illustrative embodiment.
Figure 43:
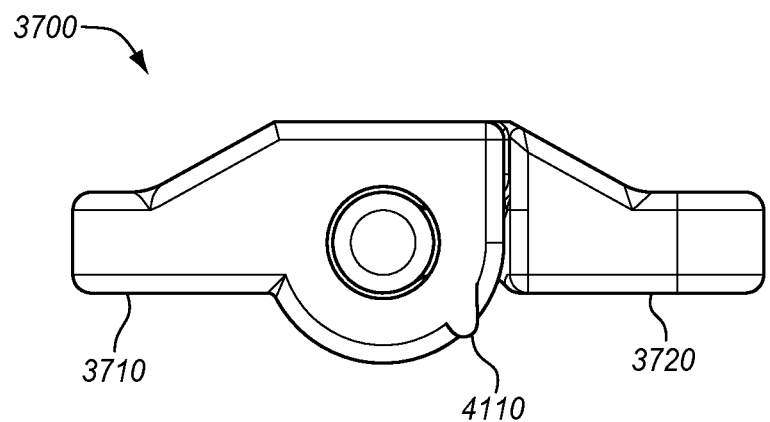
Figure 44:
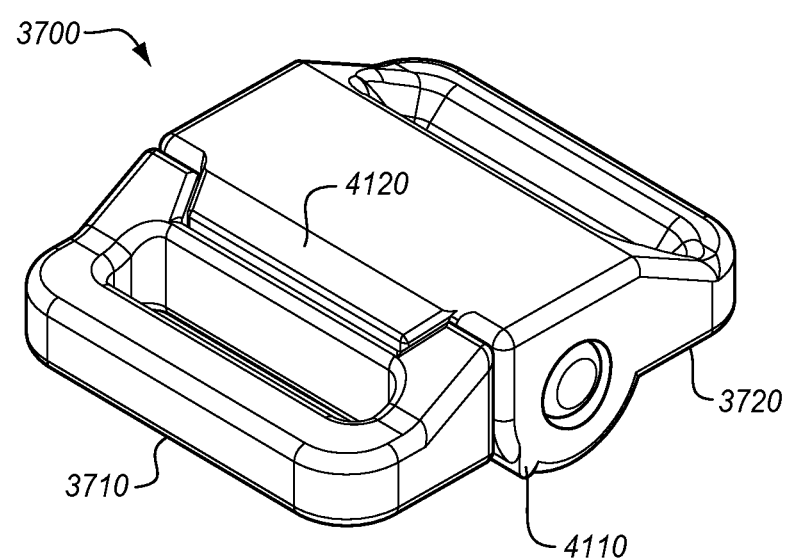
Figure 45:
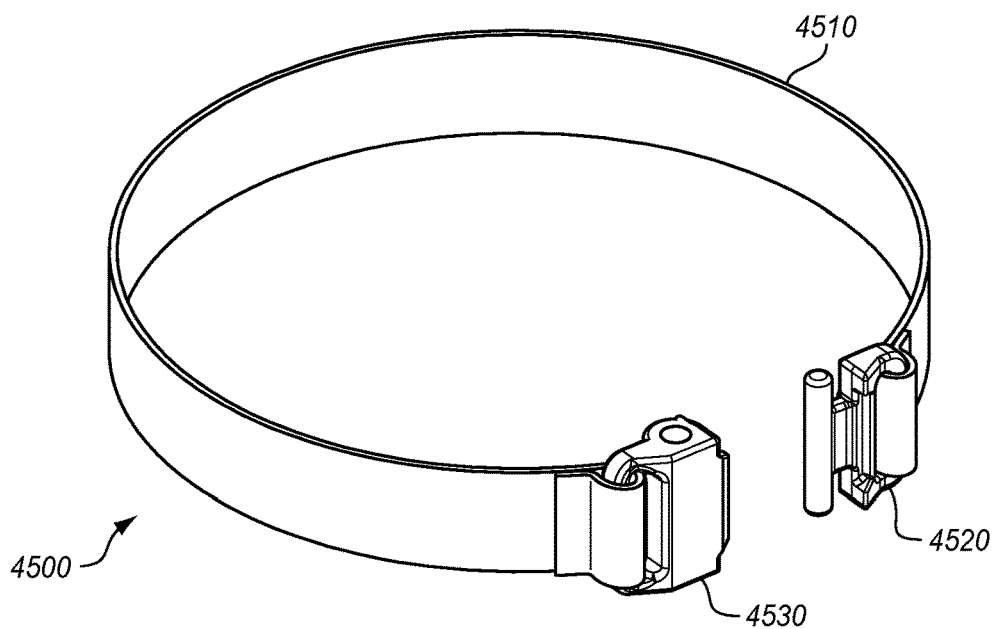
FIGS. 45-48 illustrate a collar that is extensible to include any number of accessories in an illustrative embodiment.
Figure 46:
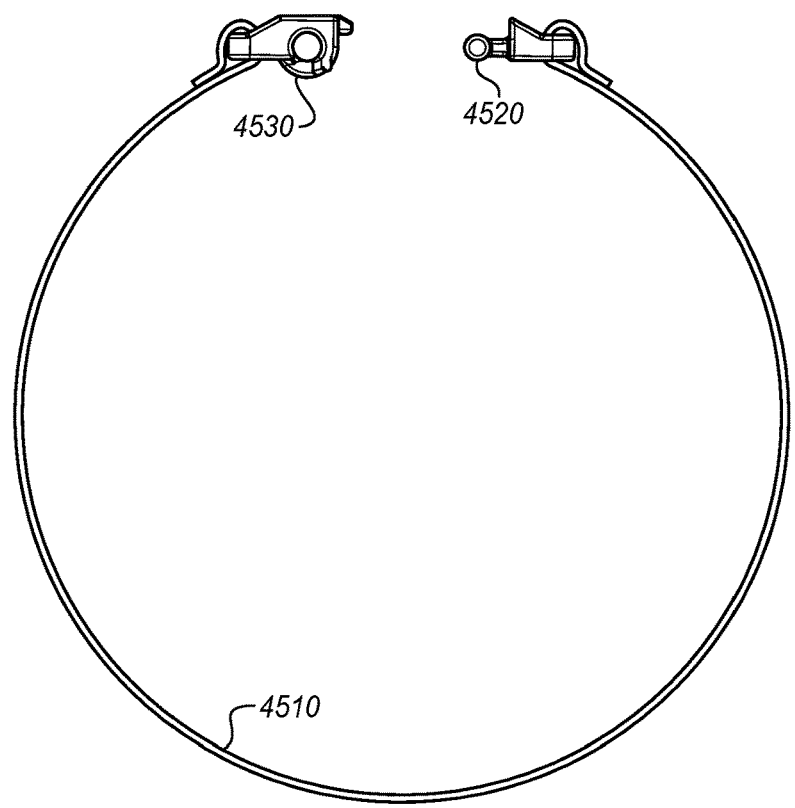

FIGS. 42-44 are views of an assembled clasp 3700 for an extensible leash in an illustrative embodiment. In FIG. 42, the clasp 3700 is open and can be slidably assembled or disassembled. The clasp awaits rotation in the indicated direction to enter a closed position wherein limited rotation is permitted until nubs 4110 resist further opening of the clasp. In FIG. 43, the clasp 3700 is closed, and nubs 4110 resist further opening when the clasp is opened by more than a threshold amount (e.g., thirty degrees, forty-five degrees, ninety degrees, etc.). This feature provides a technical benefit by reducing the chances of accidental disassembly of the clasp during use. Such features are particularly beneficial, for example, when the unit is jostled, such as when the animal being handled is playing or running.

Figure 47:
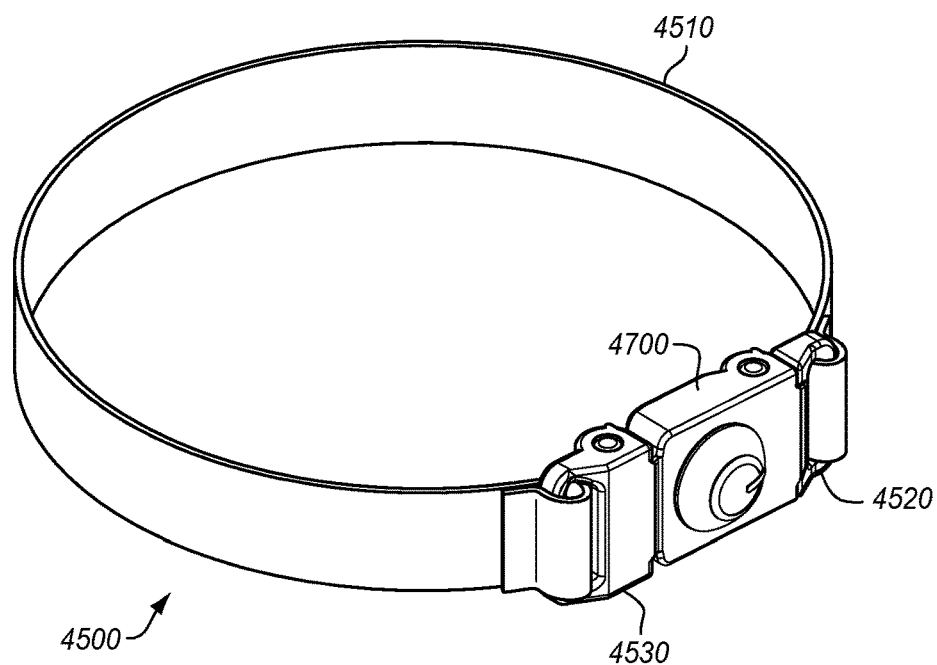
Figure 48:
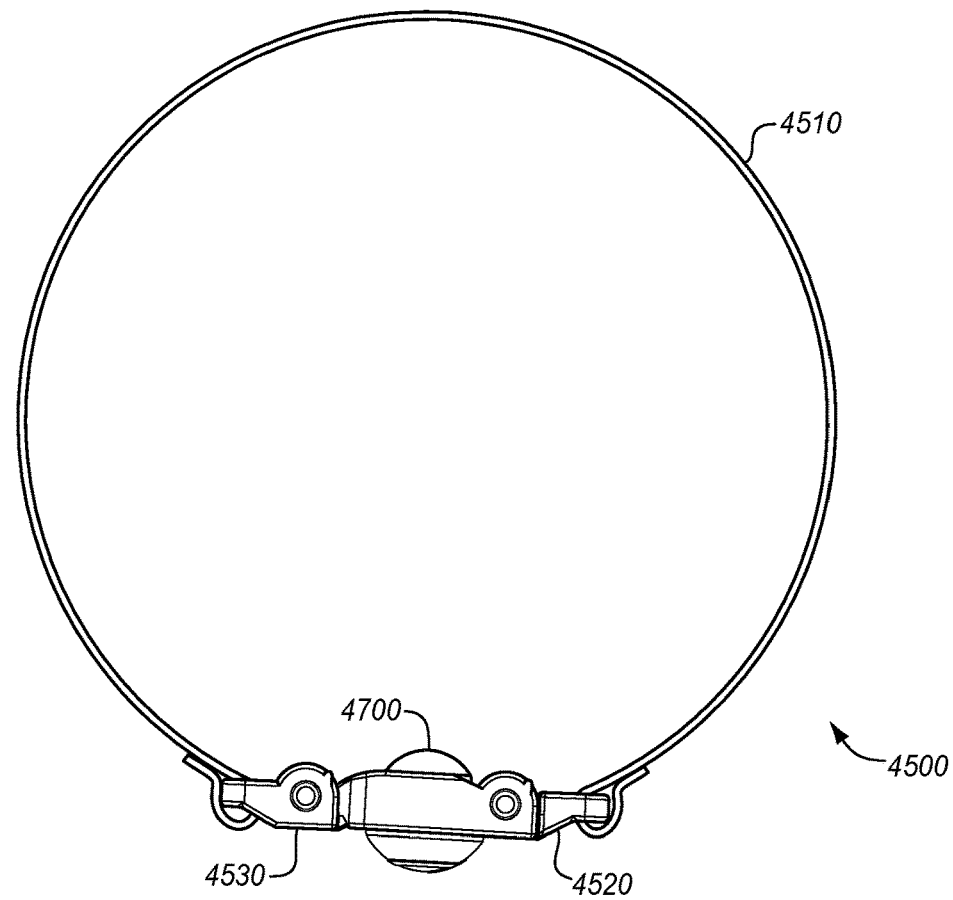

FIGS. 45-48 illustrate a collar 4500 that is extensible to include any number of accessories in an illustrative embodiment. Collar 4500 includes a portion of webbing 4510, and includes a male end 4520 and a female end 4530 of a clasp. These ends may be attached to each other, or one or more additional removable link with corresponding male and female ends may be added in-between the male end 4520 and the female end 4530. For example, as shown in FIG. 47 and FIG. 48, a removable link 4700 that includes a light is added between the male end 4520 and the female end 4530 of the collar 4500.

The "slide and snap" system described above provides numerous technical benefits. First, the clasps described above provide secure attachment points that are capable of freely pivoting to a limited degree, and are also capable of being easily swapped out or removed. Second, the clasps do not substantially increase the length of a leash or handle. Third, because the nubs 4110 enable a limited amount of rotation while still resisting over-rotation to an open state, the clasps remain flexible as desired by a leash, without compromising structural integrity. Fourth, the clasps and removable linkages described herein are interoperable between leashes, collars, and harnesses, meaning that they can be quickly changed between leashes and collars, or vice versa, as desired.

Figure 49:
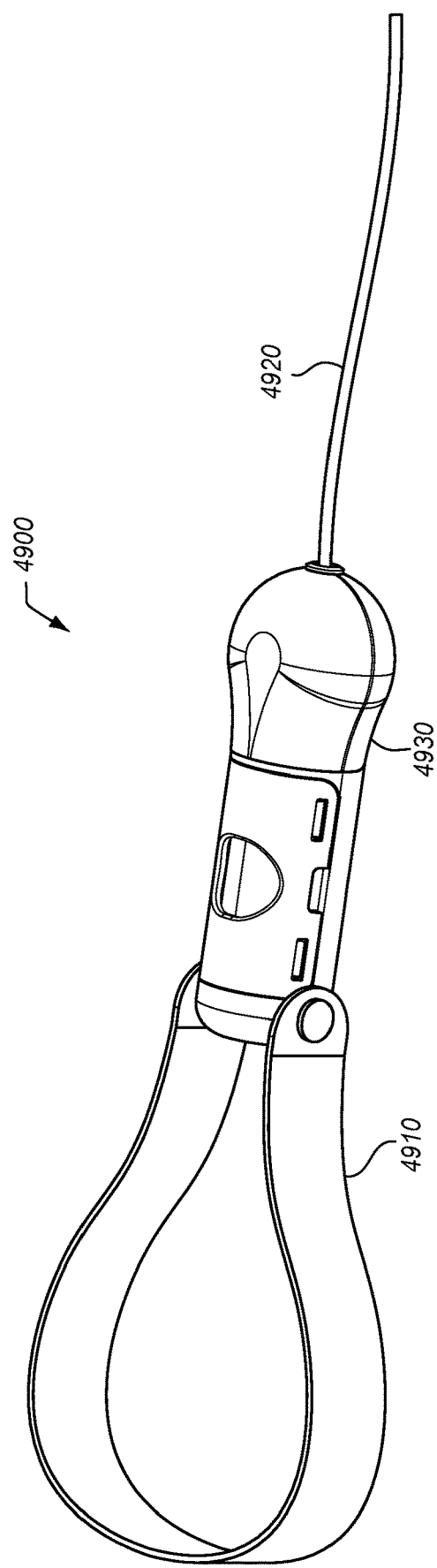
FIGS. 49-50 illustrate a leash that is retractable in an illustrative embodiment.
Figure 50:
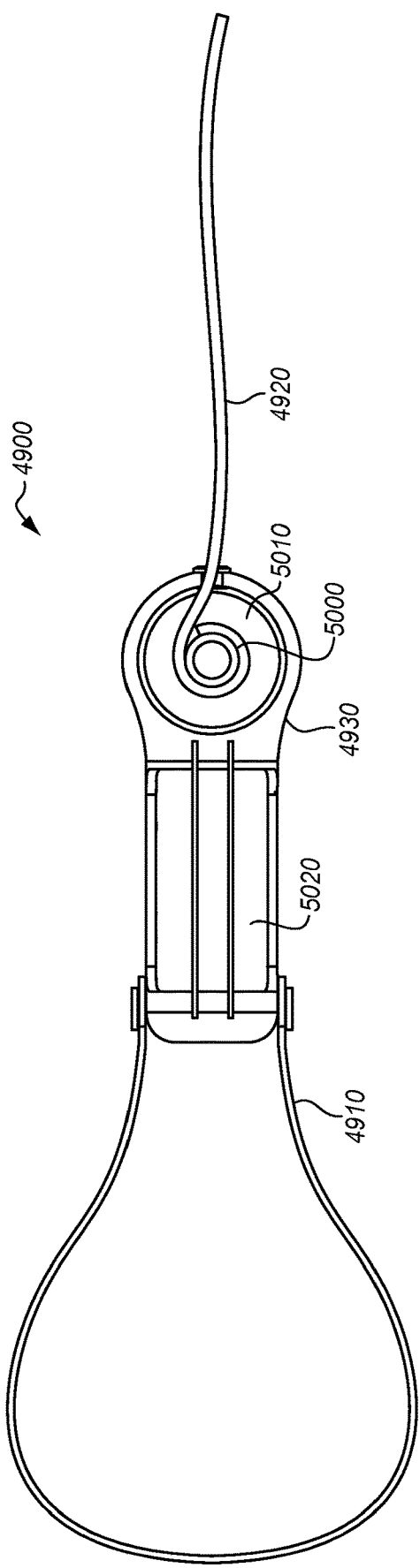

FIGS. 49-50 illustrate a leash 4900 that is retractable in an illustrative embodiment. In this embodiment, the leash 4900 includes a housing 4930 for storing articles, a handle 4910, and a lead 4920 that is retracted via spring forces into the housing 4930. FIG. 50 is a section cut view of the leash, and illustrates that the housing defines a chamber 5020 for retaining articles, as well as a chamber 5010. Chamber 5010 retains a reel 5000 or other retention device that is spring-biased to retract the lead 4920 into the chamber 501. Thus, the greater the amount of extension of the lead 4920, the greater the amount of retraction force applied by the reel 5000 to return the lead 4920 to the chamber 5010. The spring force is designed such that at rest, the lead 4920 is fully retracted.

Any of the various clasps, links, or article dispensers shown in the figures or described herein may be implemented in various combinations with leashes, collars, harnesses, or other components used for animal handling in order to enhance the ease of controlling an animal. Furthermore, the various components described herein may be utilized to handle any suitable domestic or even wild animal, ranging dramatically in size.

What is claimed is:
1. A system in the form of a leash with an integrated article dispenser, the system comprising:
   a first tensile member;
   a second tensile member; and
   an article dispenser disposed between the first tensile member and the second tensile member, the article dispenser comprising:
      a first end that is mechanically coupled with the first tensile member;
      a second end that is mechanically coupled with the second tensile member;
      a rigid housing that is disposed between the first end and the second end, that defines an internal volume for storing articles, and that further defines an opening which communicates between the internal volume and an exterior of the housing, wherein a dimension of the opening corresponds with a dimension of the articles, and wherein a majority of tensile load is borne from the first end to the second end through the housing along a portion of the housing that is disposed around the internal volume and that continues along a majority of a length of the housing, wherein the housing defines slots within the internal volume, each of the slots defining a channel that slidably receives an end of a spindle and further defining a portion that retains the end of the spindle; and
      a hatch that communicates with the internal volume, and is affixed to the housing via a hinge, wherein while the hatch is in an open position, the internal volume is exposed for receiving the spindle, and while the hatch is in a closed position, portions of the hatch obstruct access from the portions of the slots to the channels of the slots, thereby preventing sliding of the ends of the spindle,
   wherein the hatch defines a second opening which communicates with the internal volume, and permits access to the stored articles at a different radial position than the first opening, enabling pinching and rotation of the stored articles between the first opening and the second opening that causes the spindle to rotate,
   wherein in response to the article dispenser bearing a threshold amount of tension between the tensile members, a centroid of the article dispenser aligns within a threshold distance of being collinear with a force that generates the tension,
   wherein the threshold distance is one quarter of a dimension selected from the group consisting of a width of the article dispenser and a height of the article dispenser.

2. The system of claim 1 wherein:
the spindle is disposed within the internal volume and is oriented such that its central axis is collinear with the force without bearing the tensile load, wherein the articles are wrapped around the spindle.

3. The system of claim 1 wherein:
the second opening is disposed opposite the first opening.

4. The system of claim 1 wherein:
the stored articles comprise sanitary bags, and the opening has a length corresponding with a length of the spindle occupied by each of the sanitary bags.

5. The system of claim 1 wherein:
the threshold amount of tension is between one half pound of force and five pounds of force.

6. The system of claim 1 wherein:
a cord forms the first tensile member and is affixed to the first end of the housing; and
the cord continues from the second end of the housing to form the second tensile member.

7. The system of claim 1 wherein:
the first end forms a loop that the first tensile member threads through, and the second end forms a loop that the second tensile member threads through.

8. The system of claim 1 wherein:
the first tensile member comprises a cord, and the first end defines a hole through which an end of the first tensile member is inserted; and
the second tensile member comprises a cord, and the second end defines a hole through which an end of the second tensile member is inserted.

9. The system of claim 1 wherein:
the hatch comprises embosses that cover the slots while the hatch is closed.

10. The system of claim 1 wherein:
the first end comprises a clasp.

11. The system of claim 1 wherein:
the article dispenser is the sole entity that mechanically unites the first tensile member with the second tensile member.

12. The system of claim 1 wherein:
the first tensile member is removably attached to the first end.

13. The system of claim 1 wherein:
the first tensile member comprises a loop, wherein one end of the loop is fixedly attached to the first end, and another end of the loop is removably attached to the first end.

14. An apparatus in the form of an article dispenser comprising:
a first end;
a second end;
a rigid housing that is disposed between the first end and the second end, that defines an internal volume for storing articles, wherein a majority of tensile load borne from the first end to the second end through the housing is transferred along a portion of the housing that is disposed around the internal volume and that continues along a majority of a length of the housing,
wherein the housing defines slots within the internal volume, each of the slots defining a channel that slidably receives an end of a spindle and further defining a portion that retains the end of the spindle; and
a hatch that communicates with the internal volume, and is affixed to the housing via a hinge, wherein while the hatch is in an open position, the internal volume is exposed for receiving the spindle, and while the hatch is in a closed position, portions of the hatch obstruct access from the portions of the slots to the channels of the slots, thereby preventing sliding of the ends of the spindle,
wherein in response to the article dispenser bearing a threshold amount of tension, a centroid of the article dispenser aligns within a threshold distance of being collinear with a force that generates the tension,
wherein the threshold distance is one quarter of a dimension selected from the group consisting of a width of the article dispenser and a height of the article dispenser.

15. The apparatus of claim 14 wherein:
the spindle is disposed within the internal volume and is oriented such that its central axis is collinear with the force without bearing the tensile load, wherein the articles are wrapped around the spindle.

16. The apparatus of claim 15 wherein:
the housing defines a first opening which communicates between the internal volume and an exterior of the housing, and the hatch defines a second opening which communicates with the internal volume, and permits access to the stored articles at a different radial position than the first opening, such that pinching the stored articles between the first opening and the second opening and rotating the stored articles causes the spindle to rotate.

17. The apparatus of claim 15 wherein:
the stored articles comprise sanitary bags, and the opening has a length corresponding with a length of the spindle occupied by each of the sanitary bags.

18. The apparatus of claim 15 wherein:
the threshold amount of tension is between one half pound of force and five pounds of force.

19. The apparatus of claim 15 wherein:
the hatch comprises embosses that cover the slots while the hatch is closed.

20. A system in the form of a leash with an integrated article dispenser, the system comprising:
a first tensile member;
a second tensile member; and
an article dispenser disposed between the first tensile member and the second tensile member, the article dispenser comprising:
a first end comprising a loop that directly contacts the first tensile member;
a second end comprising a loop that directly contacts the second tensile member;
a rigid housing that is integral with the first end and the second end, is disposed between the first end and the second end, defines an internal volume for storing articles, and further defines an opening which communicates between the internal volume and an exterior of the housing, wherein a length of the opening corresponds with a dimension of the articles, and a majority of tensile load is borne from the first end to the second end through the housing along a portion of the housing that is disposed around the internal volume and that continues along a majority of a length of the housing,
wherein the housing defines slots within the internal volume, each of the slots defining a channel that slidably receives an end of a spindle and further defining a portion that retains the end of the spindle;
a hatch that communicates with the internal volume, and is affixed to the housing via a hinge, wherein while the hatch is in an open position, an entirety of the internal volume is exposed for receiving the spindle, and while the hatch is in a closed position, portions of the hatch obstruct access from the portions of the slots to the channels of the slots, thereby preventing sliding of the ends of the spindle, wherein the hatch defines a second opening that is disposed opposite the first opening, and the hatch comprises:

embosses that cover the slots while the hatch is closed; and receptacles that couple with prongs at the housing to secure the hatch in place at the housing; and the spindle, wherein the spindle is disposed within the internal volume and stores the articles, wherein in response to the article dispenser bearing a threshold amount of tension between the tensile members, a centroid of the article dispenser aligns within a threshold distance of being collinear with a force that generates the tension, wherein while the centroid of the article dispenser is within the threshold distance of being collinear with the force, rotation of the system about an axis of the force does not cause the article dispenser to apply more than a threshold torque to the tensile members, wherein the threshold distance is one quarter of a dimension selected from the group consisting of a width of the article dispenser and a height of the article dispenser, and the threshold amount of tension is between one half pound of force and five pounds of force, and wherein the spindle is oriented such that its central axis is collinear with the force.

* * * * *